Sept. 10, 1963  B. E. HOOPER  3,103,664
REMOTELY CONTROLLED APPARATUS
Filed Oct. 10, 1958  9 Sheets-Sheet 1
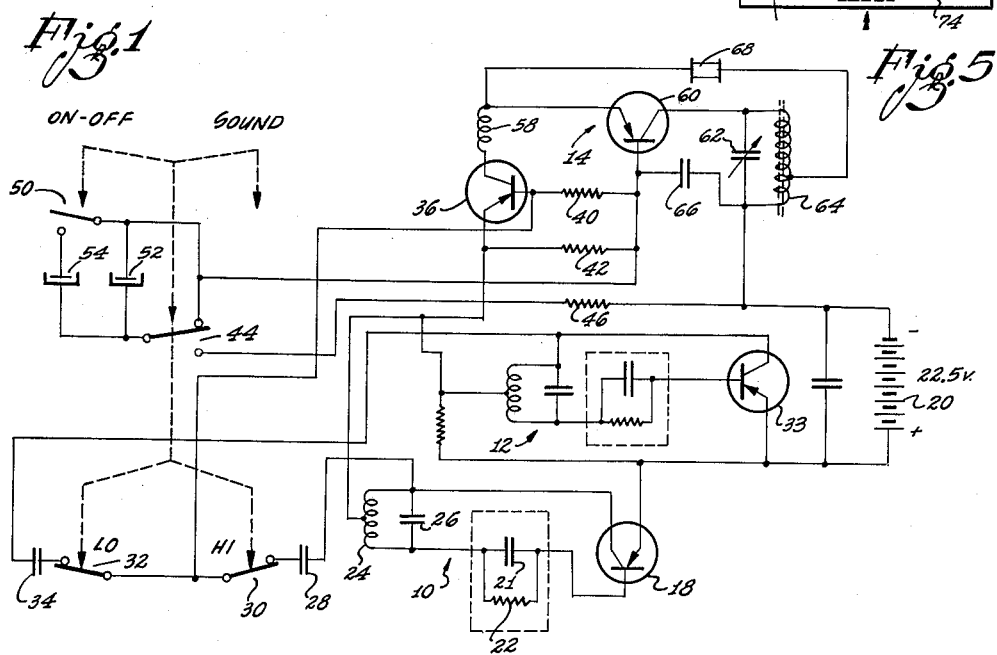
INVENTORS.
Brian E. Hooper
By Smyth & Roston
Attorneys

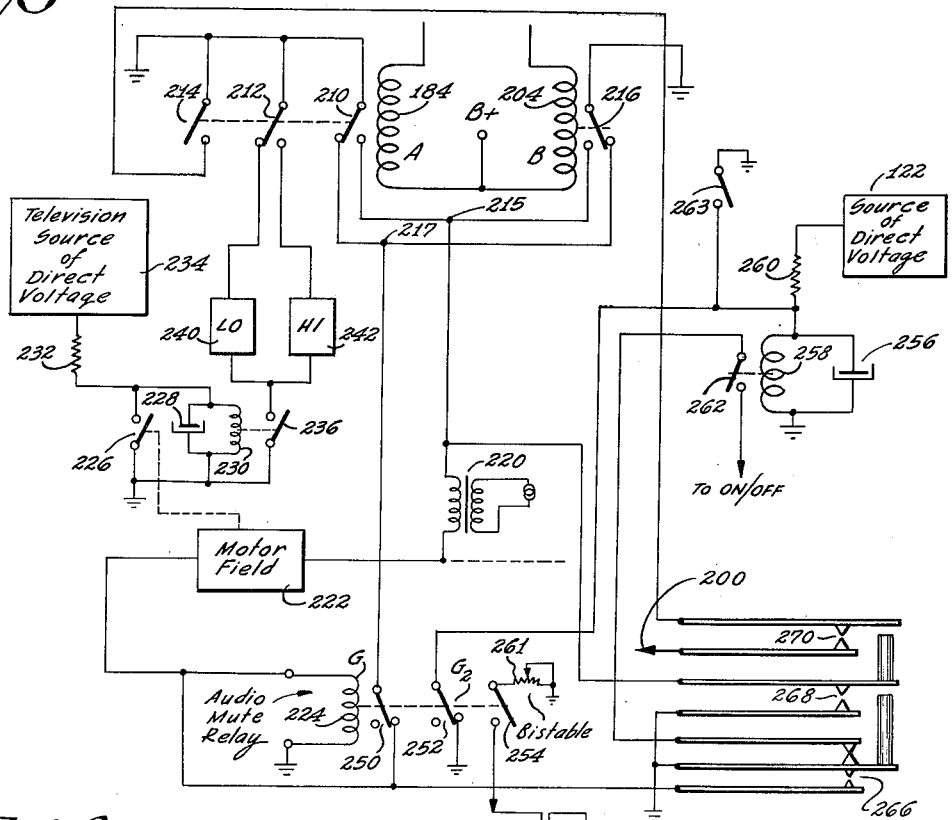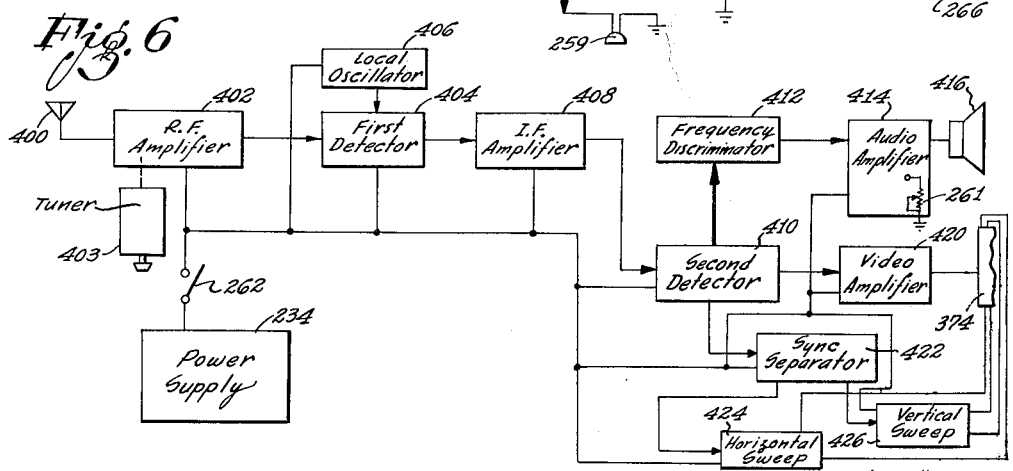

Sept. 10, 1963 B. E. HOOPER 3,103,664
REMOTELY CONTROLLED APPARATUS
Filed Oct. 10, 1958 9 Sheets-Sheet 3

INVENTOR.
Brian E. Hooper
By Smyth & Roston
Attorneys

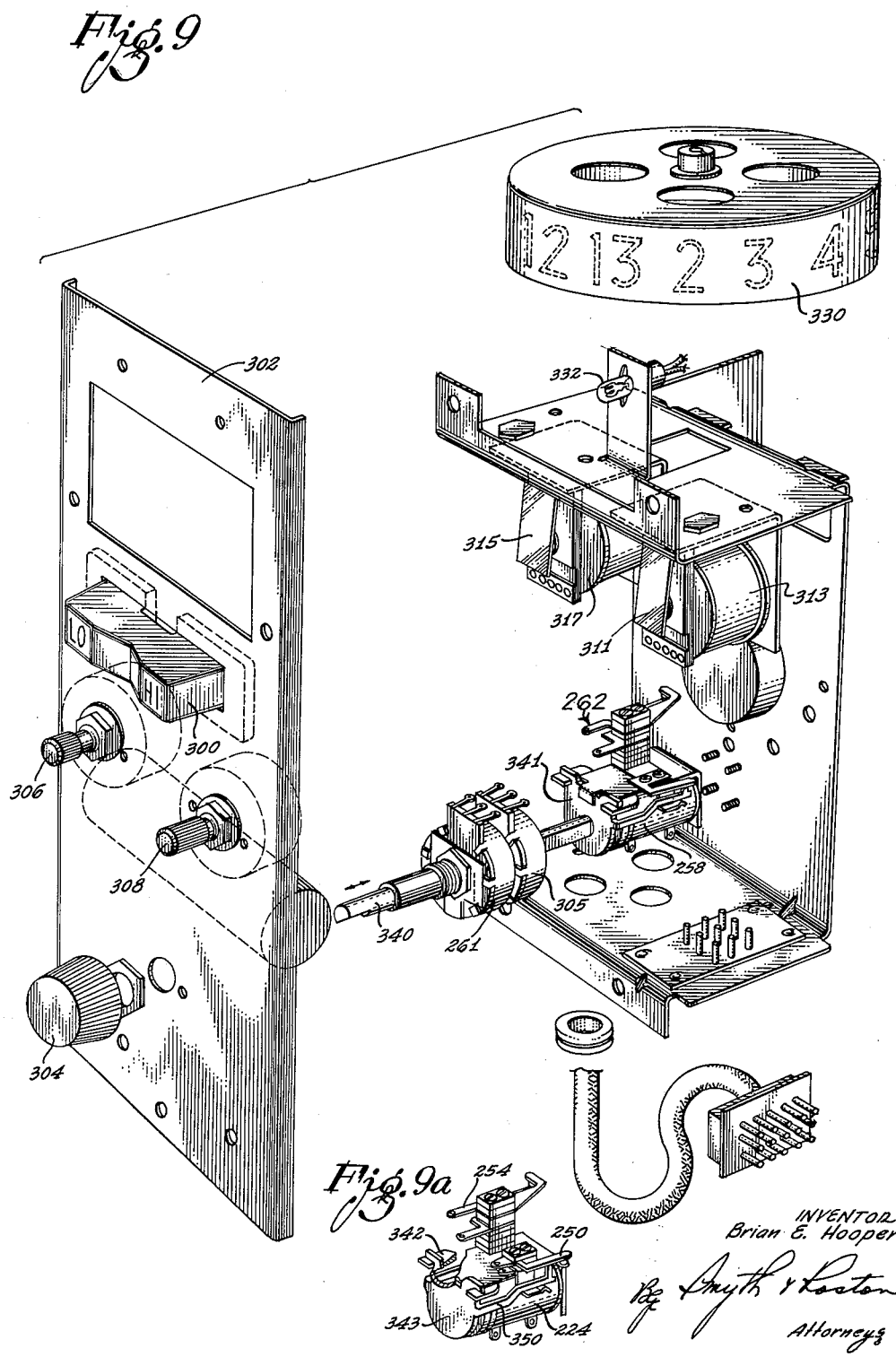

Sept. 10, 1963   B. E. HOOPER   3,103,664
REMOTELY CONTROLLED APPARATUS
Filed Oct. 10, 1958   9 Sheets-Sheet 5

INVENTOR:
Brian E. Hooper

Smyth & Roston
Attorneys

Sept. 10, 1963  B. E. HOOPER  3,103,664
REMOTELY CONTROLLED APPARATUS
Filed Oct. 10, 1958  9 Sheets-Sheet 6
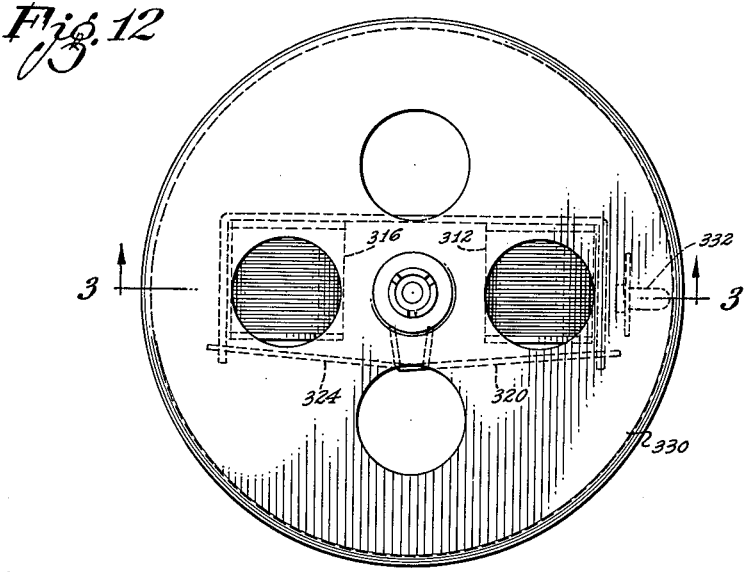
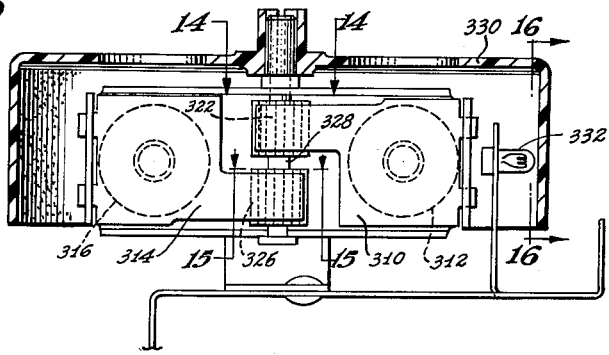
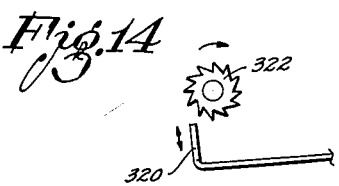
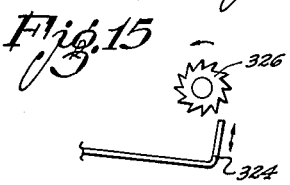
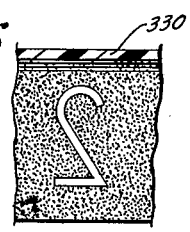
INVENTOR:
Brian E. Hooper
Attorneys Sept. 10, 1963   B. E. HOOPER   3,103,664
REMOTELY CONTROLLED APPARATUS
Filed Oct. 10, 1958   9 Sheets-Sheet 7
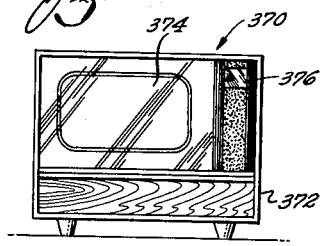
Fig.17
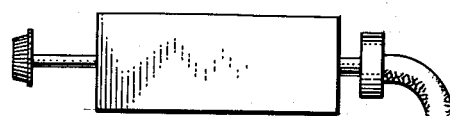
Fig.18
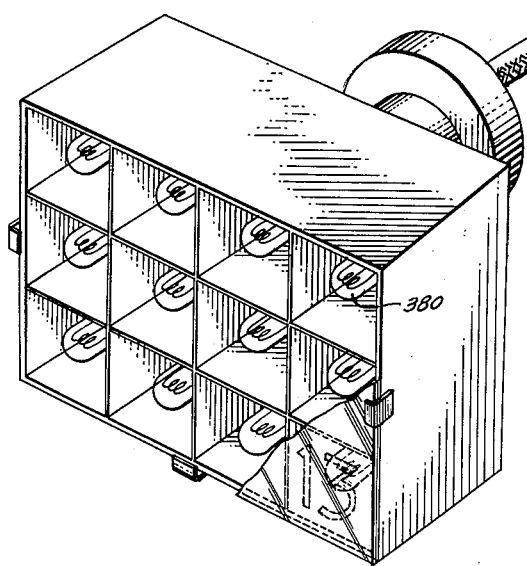
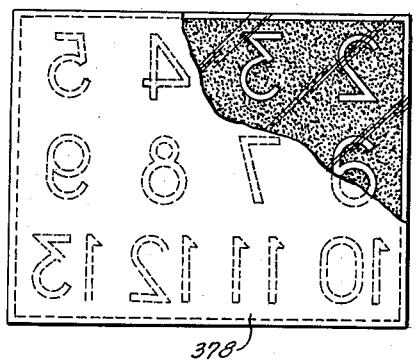
Fig.19
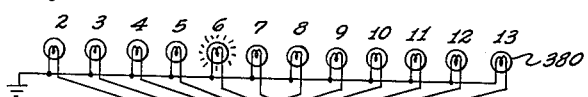
Fig.20
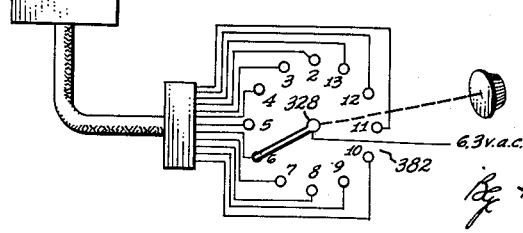
INVENTOR:
Brian E. Hooper
Attorneys Sept. 10, 1963 B. E. HOOPER 3,103,664
REMOTELY CONTROLLED APPARATUS
Filed Oct. 10, 1958 9 Sheets-Sheet 9
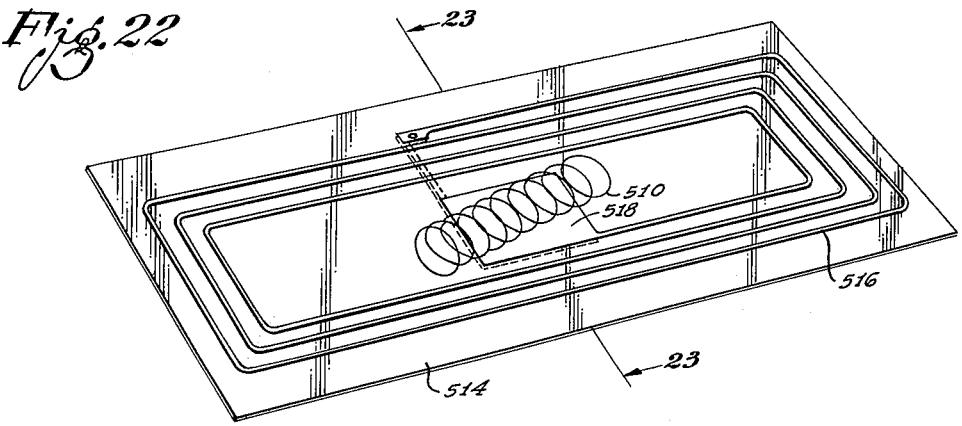
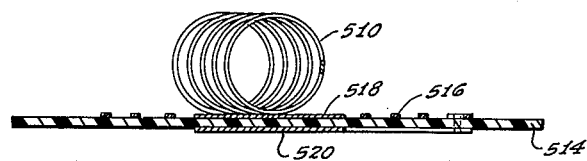
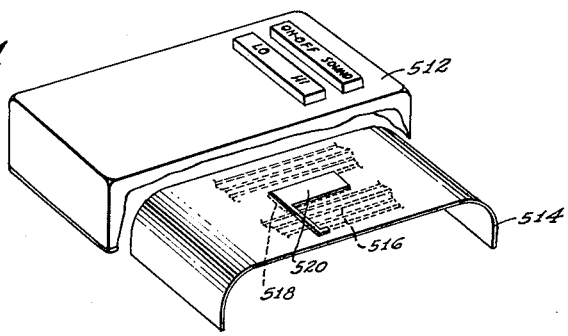
INVENTOR:
Brian E. Hooper
Attorneys

United States Patent Office 3,103,664
Patented Sept. 10, 1963

3,103,664
REMOTELY CONTROLLED APPARATUS
Brian E. Hooper, Sherman Oaks, Calif., assignor to Packard-Bell Electronics Corporation, Los Angeles, Calif., a corporation of California
Filed Oct. 10, 1958, Ser. No. 766,436
19 Claims. (Cl. 343—225)

This invention relates to apparatus for providing selective signals controlling different operations in a receiver which is spaced from the selective signal means. More particularly, the invention relates to apparatus for providing a remote control over the operation of a television receiver such as to adjust the channel being selected for reception, to mute or restore the sound and to turn the receiver on and off.

Television has become so widely accepted in recent years that it is almost considered as a necessity by a vast majority of the population. For example, television programs are enjoyed by all members of the family during the evening hours. The children watch their favorite programs in the early hours after the evening meal and the adults assume control of the set after the children have gone to bed. In this way, the adults may at least be able to watch their favorite programs in the late evening hours.

In order to satisfy himself as well as any other people who may be simultaneously watching a program, a viewer may often have to make different adjustments in the operation of the receiver. For example, in the large communities where several stations are available for reception, the viewer may at times desire to hunt for the best program to watch at any particular time. This is especially true when a number of people are simultaneously watching a program and each one expresses his preferences or dislikes. By way of further illustration, some people may be dissatisfied with the sound portion of a television program, especially during commercials and may want to mute the sound during these periods.

In most television receivers, such controls as the selection of stations or an adjustment in sound have to be provided manually by a person who must approach the set in order to operate the controls. This may sometimes be distressing to the viewer, especially when he is comfortably settled in a lounge chair for an evening's entertainment after a full day's exertions at his appointed tasks.

Various attempts have been made to provide apparatus which will allow a viewer to adjust different controls in the receiver even while he is comfortably settled at a distance from the receiver. For example, apparatus has been built in which tuning rods have been actuated upon the manual operation of switches to produce signals at different frequencies. Each frequency provides a different control over the operation of the receiver. For example, signals at a first frequency may advance the selector switch in a forward direction and signals at a second frequency may advance the selector switch in a reverse direction. In such systems, signals at a third frequency may mute the sound and signals at a fourth frequency may turn off the television receiver.

The systems previously proposed have had certain disadvantages. One of these disadvantages has resulted from the need for a separate oscillator and the need for separate discriminating stages and relay control stages in association with each oscillator to separate signals at the different frequencies. Other disadvantages have resulted from the inherent operation of the systems. By way of illustration, a viewer wants to be able to control the operation of the television receiver either at the receiver or from a remote position without being concerned as to the setting of any special switch at the receiver. In the systems now in use, a special switch is included at the television receiver. In one position of this switch, control over the operation of the receiver can only be provided by manual operation of the receiver and cannot be provided from the remote position. In a second position of the switch, control over the operation of the receiver can only be provided from the remote position and not by manual operation of the receiver. This is undesirable since it prevents the viewer from taking full advantage of the manual controls at the receiver and the remote control unit.

This invention provides a remote control system which overcomes the above disadvantages. The system provides first and second frequencies and particular combinations of frequencies to control different operations in the television receiver. The number of operations controlled by the first and second frequencies is even further expanded by varying the period of time during which the different combinations of signals are produced. For example, the remote control system constituting this invention provides signals only at a first frequency to advance the station selector in the forward direction and signals only at a second frequency to advance the station selector in a reverse direction. Signals at both the first and second frequencies are produced for a first particular period of time to control the muting of sound. In like manner, signals at both the first and second frequencies are produced for a second particular period of time greater than the first particular period of time to control the "on" and "off" states of operation. By providing different combinations of signals and by providing the various combinations for different periods of time, a number of selected controls over the operation of the television receiver can be obtained with signals at only a pair of frequencies.

The remote control system constituting this invention has certain other important advantages. For example, the apparatus constituting the transmitter portion of this invention provides stages for producing oscillatory signals at a constant amplitude for controlled periods of time which may have either the first or second duration. The receiver portion of the apparatus constituting this invention receives the signals transmitted at the first and second frequencies and provides controls in accordance with the particular signals received. For example, the receiver portion of the apparatus constituting this invention is constructed so that the station selector will be advanced only when signals at one or the other of the control frequencies is received. This prevents the selector from being advanced when signals at both of the control frequencies are received. In this way, the selector switch cannot be advanced at the time that the sound in the television receiver becomes muted or the television receiver is turned on or off.

In a second embodiment of the invention, signals at three different frequencies are produced at the remote control transmitter. The signals at the first and second frequencies respectively control the advance of the station selector in the forward and reverse directions. Signals at the third frequency with a first particular duration control the muting of the sound. The signals at the third frequency also control the operation of the on-off switch in the television receiver when they have a second particular duration greater than the first particular duration. A receiver is also included in this second embodiment corresponding substantially to the receiver in the first embodiment except for the addition of a tuned circuit to pass the signals at the third frequency.

In the drawings:
FIGURE 1 is a circuit diagram of a transmitter which is included in one embodiment of the remote control apparatus constituting this invention;

FIGURE 2 is a front elevational view of a casing for holding the transmitter shown in FIGURE 1 and particularly illustrates buttons which are adapted to be depressed to provide for the transmission of different signals controlling various operations in a television receiver;

FIGURE 3 is a side elevational view of the casing shown in FIGURE 2 and of the buttons externally supported on the casing;

FIGURE 4 is a sectional view substantially on the line 4—4 of FIGURE 3 and particularly illustrates the construction of a switching assembly which is operably coupled to one of the buttons shown in FIGURES 2 and 3 to control the operation of the transmitter in accordance with the particular depression of the button;

FIGURE 5 is a sectional view substantially on the line 5—5 of FIGURE 3 and illustrates the construction of a second switching assembly which is operatively coupled to the other button shown in FIGURES 2 and 3;

FIGURE 5a is a somewhat schematic perspective view of certain components of the switching assembly shown in FIGURES 4 and 5 and illustrates the construction and relative disposition of these components in further detail;

FIGURE 6 is a block diagram of a television receiver, the operation of which may be controlled by the apparatus constituting this invention;

FIGURE 8 is a circuit diagram of the electrical features in a control unit which operates in conjunction with the remote control receiver shown in FIGURE 7 to provide different controls over the operation of the television receiver shown in FIGURE 6;

Figure 7:
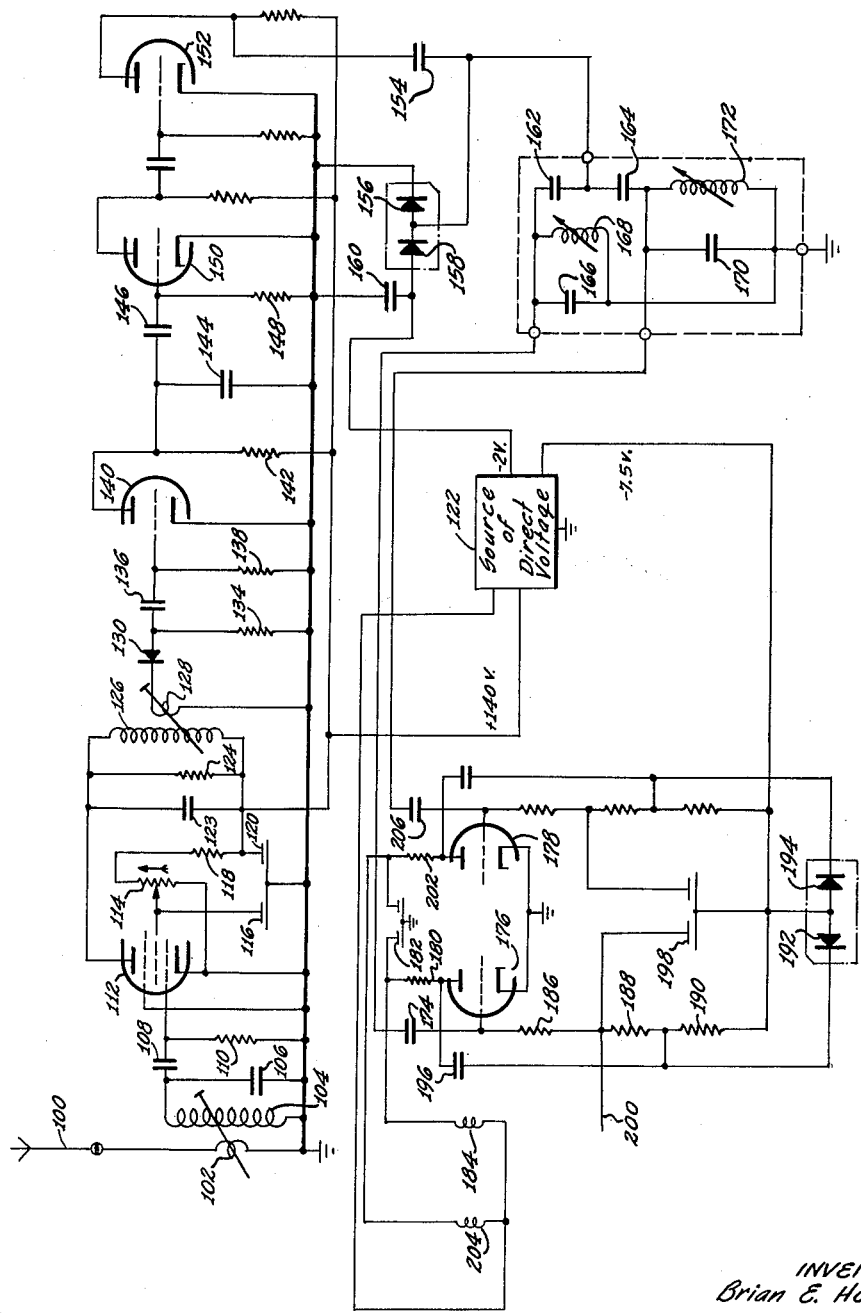
FIGURE 7 is a circuit diagram of a receiver which is included in the embodiment of the remote control apparatus constituting this invention to receive the control signals from the transmitter shown in FIGURES 1 to 5, inclusive.
Figure 10:
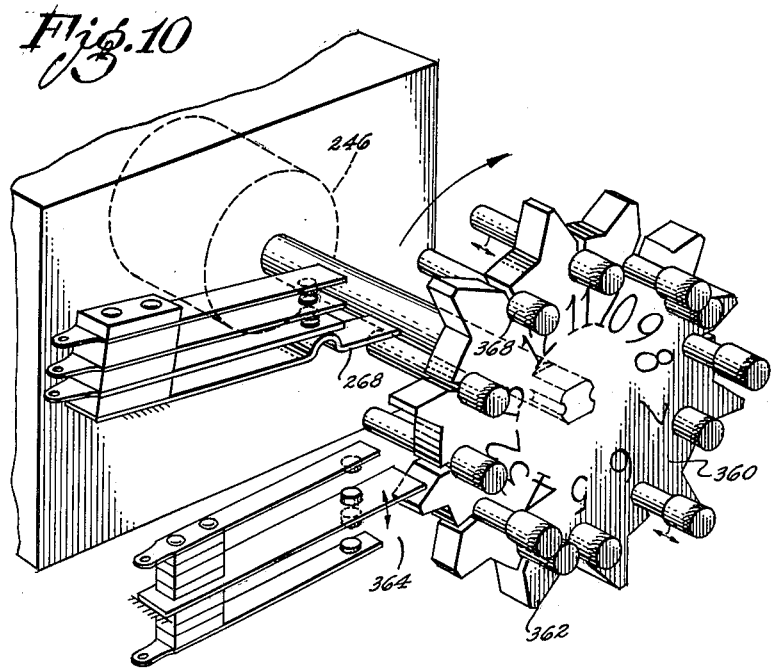
Figure 11:
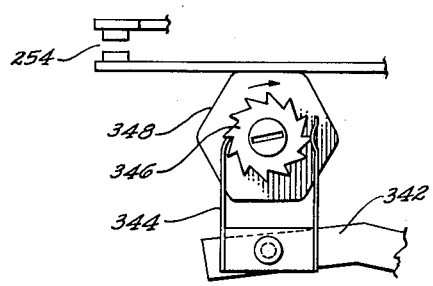
Figure 21:
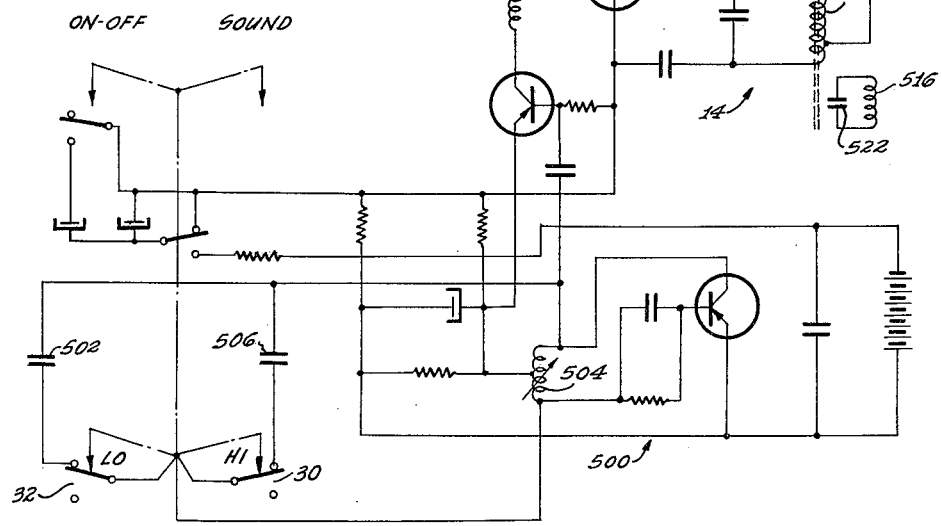
Figure 25:
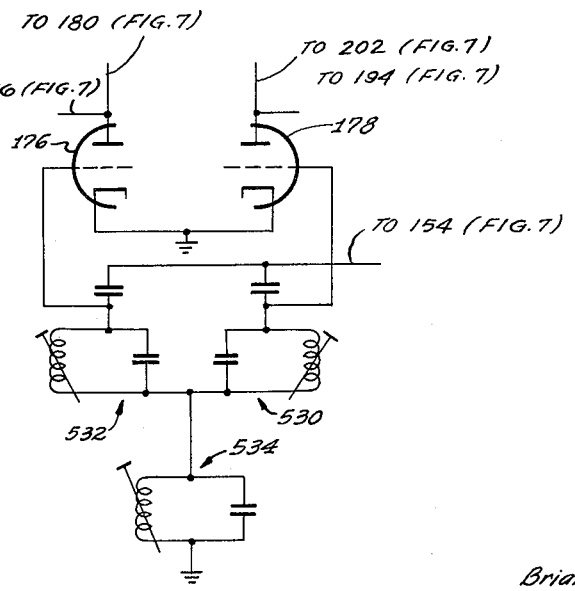

FIGURE 9 is a partially exploded perspective view illustrating the construction of certain switches included in the control unit shown in FIGURE 8 to control different operations such as turning the television receiver on and off and changing the station being viewed and further illustrates control knobs and buttons which are preferably disposed at the front of the television receiver to provide manual controls over these operations;

FIGURE 9a is a perspective view of a particular one of the switches included in the control unit shown in FIGURE 8, with certain components being broken away to illustrate other components in further detail;

FIGURE 10 is an enlarged perspective view of switching apparatus providing an advance of a station selector from one station to the next station available for viewing in a particular locality and for providing such advance in either a forward or reverse direction;

FIGURE 11 is a side elevational view of a bistable switch also shown in FIGURE 9a and illustrates in further detail certain features to provide a bistable operation of the switch;

FIGURE 12 is an enlarged top plan view of the station selector and particularly illustrates the construction of solenoids and associated members for providing an advance of the station selector in either the forward or reverse directions;

FIGURE 13 is an enlarged sectional view substantially on line 13—13 of FIGURE 12 and illustrates the construction of the station selector in further detail;

FIGURE 14 is an enlarged sectional view substantially on the line 14—14 of FIGURE 13 and illustrates the construction and relative disposition of a ratchet and pawl arrangement for advancing the station selector in the forward direction;

FIGURE 15 is an enlarged sectional view substantially on the line 15—15 of FIGURE 14 and illustrates the construction and relative disposition of a second ratchet and pawl arrangement for advancing the station selector in the reverse direction;

FIGURE 16 is an enlarged fragmentary sectional view substantially on the line 16—16 of FIGURE 13 and particularly illustrates the disposition of successive numerical integers at spaced intervals on the casing of the station selector to indicate the particular channel being selected for reception at any instant;

FIGURE 17 is a front elevational view of a television receiver and particularly illustrates apparatus for providing a distant indication as to the channel being selected for reception at any instant;

FIGURE 18 is an enlarged perspective view of the apparatus shown in FIGURE 17 for providing a distant indication as to the channel being selected for reception at any instant;

FIGURE 19 is a rear elevational view of the apparatus shown in FIGURE 18 and particularly illustrates the numerical designations provided in the apparatus shown in FIGURE 18 to indicate the different channels in the television receiver and further indicates the disposition of these numerical designations to provide a remote indication as to the channel selected at any instant;

FIGURE 20 is a circuit diagram schematically illustrating the electrical circuits for controlling the distant indication as to the channel selected at any instant;

FIGURE 21 is a circuit diagram of a transmitter which is included in a second embodiment of the invention;

FIGURE 22 is a perspective view of the mechanical features of the embodiment shown in FIGURE 21 and particularly illustrates the construction and relative disposition of a coil and a printed circuit which are disposed to provide an omnidirectional radiation of signals to a television receiver;

FIGURE 23 is a sectional view substantially on the line 23—23 of FIGURE 22 and further illustrates the construction of the printed circuit shown in FIGURE 22 and the disposition of the printed circuit relative to the coil;

FIGURE 24 is an exploded perspective view of the printed circuit and of a casing for housing the printed circuit; and FIGURE 25 is a fragmentary circuit diagram illustrating modifications to be made in the receiver shown in FIGURE 7 when the transmitter shown in FIGURE 21 is used in place of the transmitter shown in FIGURE 1.

*Remote Control Transmitter*

The transmitter shown in FIGURE 1 includes a first oscillator generally indicated at 10 for producing modulating signals at a first frequency, a second oscillator generally indicated at 12 for producing modulating signals at a second frequency and a third oscillator generally indicated at 14 for producing carrier signals at a third frequency. The oscillator 10 includes a semi-conductor such as a PNP transistor 18 which may be a type 2N406 or a type 2N363. The emitter of the transistor 18 is connected to the positive terminal of a source 20 of direct voltage, which is illustrated in FIGURE 1 as a battery. The voltage source 20 may be adapted to provide a potential of approximately 22.5 volts.

Connections are made from the base of the transistor 18 to first terminals of a capacitance 21 and a resistance 22 which may be respectively provided with values of 470 micro-microfarads and 100 kilo-ohms. A parallel combination of a coil 24 and a capacitance 26 is in series with the parallel combination of the capacitance 21 and the resistance 22 between the base and collector of the transistor 18. The capacitance 26 may be provided with a value of approximately 0.01 microfarad, and the coil 24 may be adjustably tuned so that the oscillator 10 has a natural frequency of 20 kilocycles per second. A coupling capacitance 28 is electrically disposed between the collector of the transistor 18 and the stationary contact of a manually operated single-pole, single-throw switch 30.

The oscillator 12 may be constructed in a similar manner to the oscillator 10 but may be provided with parameters to have a natural frequency of 100 kilocycles per second. The oscillator includes a semiconductor such as a transistor 33, which may also be a type 2N406 or 2N363. The collector of the transistor 33 is coupled through a capacitance 34 to the stationary contact of a manually operated single-pole, single-throw switch 32. As will be described in detail subsequently, the movable arms of the switches 30 and 32 are coupled to opposite ends of a single pivotable button. The movable arms of the switches 30 and 32 are electrically coupled to the base of a semiconductor such as a transistor 36, which may also be a type 2N363 or a type 2N406.

A pair of resistances 40 and 42 are in series between the base and emitter of the transistor 36. The resistances 40 and 42 may respectively have values of 4.7 kilo-ohms and 39 kilo-ohms. The emitter of the transistor 36 is connected to an intermediate tap in the tuned coil 24 forming part of the oscillator 10 and to an intermediate tap in a corresponding coil forming part of the oscillator 12.

The collector of the transistor 36 is connected to one terminal of a choke coil 58 having characteristics for filtering signals at the carrier frequency provided by the oscillator 14. The second terminal of the choke coil 58 has a common connection with the emitter of a semiconductor such as a PNP transistor 60, which may be a type 2N371. The base of the transistor 60 is directly coupled to the terminal common to the resistances 40 and 42.

A parallel circuit formed by a variable capacitance 62 and a coil 64 is tuned to produce oscillatory signals at a suitable carrier frequency such as approximately 27 megacycles per second. This parallel tuned circuit is connected at one end to the collector of the transistor 60 and at the other end to one plate of a capacitance 66, which may have a value of 0.001 microfarad. The second plate of the capacitance 66 is connected to the base of the transistor 60. A crystal 68 is connected between the emitter of the transistor 60 and an intermediate tap in the coil 64 and is provided with characteristics for producing signals at 27 megacycles per second.

The terminal common to the resistances 40 and 42 extends electrically to the upper stationary contact in FIGURE 1 of a manually operated single-pole, double-throw switch 44. The movable arm of the switch 44 is ganged to the switches 30 and 32 so that the movable arm of the switch 44 becomes pivoted into engagement with the lower stationary contact in FIGURE 1 when either of the movable arms in the switches 30 and 32 becomes actuated. The lower stationary contact of the switch 44 in FIGURE 1 is electrically connected to one terminal of a resistance 46 having its second terminal connected to the negative terminal of the battery 20 and to the terminal common to the capacitances 62 and 66. The resistance 46 may have a value of 68 kilo-ohms.

The movable arm of the switch 44 is also mechanically coupled to the movable arm of a manually operated single-pole, single-throw switch 50. The movable arm of the switch 50 is electrically connected to a first plate of a capacitance 52, which may have a value of 4 micro-microfarads. The stationary contact of the switch 50 in FIGURE 1 has a common connection with a first plate of a capacitance 52, which may have a value of 25 micro-microfarads. The second terminals of the capacitances 52 and 54 are connected to the movable arm of the switch 44.

The transmitter shown in FIGURE 1 is housed in a casing 70 (FIGURES 2 to 5, inclusive). A pair of buttons 72 and 74 are supported on the front wall of the casing for pivotal movement relative to the casing.

For example, the button 72 can be depressed either at its left end or at its right end such that, when the button 72 is depressed at either end, the other end remains stationary. As will become apparent subsequently, each of the buttons 72 and 74 can be replaced by two buttons since each of the buttons 72 and 74 controls two different operations. A U-shaped actuator 76 is attached to the button 72 at a position within the casing for movement with the button. One leg of the U-shaped actuator 76 is disposed in contiguous relationship to the movable arm of the switch 30 (also shown in FIGURE 1), and the other leg of the actuator 76 is disposed in contiguous relationship to the movable arm of the switch 32 (also shown in FIGURE 1). A coupling member 78 extends inwardly from the actuator 76 at an intermediate position between the opposite legs of the actuator. A lever arm 80 is attached at one end to the coupling member 78 and is coupled at the other end to a spiral spring 82. The second end of the spring 82 is coupled to the movable arm of the switch 44 (also shown in FIGURE 1).

The button 74 is pivotable at its opposite ends in a manner similar to that described above for the button 72. A U-shaped actuator 86 is attached to the button 74 for movement with the button in a manner similar to that described above for the actuator 76 and the button 72. One leg of the actuator 86 is disposed in contiguous relationship to the movable arm of the switch 50 (also shown in FIGURE 1) so as to close the switch when the left end of the button 74 in FIGURE 2 is depressed. The actuator 86 is disposed in contiguous relationship to the coupling member 78 to produce a movement of the arm in accordance with the depressions of the button.

As previously described, the oscillator 10 produces signals at a suitable modulating frequency such as 20 kilocycles per second, and the oscillator 12 produces signals at a suitable modulating frequency such as 100 kilocycles per second. In the normal positioning of the movable arm of the switch 30, the signals produced by the oscillator 10 pass through the coupling capacitance 28 and through the stationary contact and the movable arm of the switch 30 to the base of the transistor 36. The signals are not able to pass through the transistor 36 when the transistor 60 is not conductive since the two transistors are in series. The transistor 60 is generally not conductive when the movable arm of the switch 44 engages the upper stationary arm in FIGURE 1 since the oscillator 14 is not in the oscillatory state at such time. This results from the fact that neither of the capacitances 52 and 54 is connected in the circuit of the oscillator 14 at such times.

When either one of the buttons 72 and 74 is depressed, one leg of the U-shaped bracket attached to the depressed button becomes displaced in a direction to actuate the movable arm of the contiguous switch. At the same time, the U-shaped bracket acts upon the coupling member 78 to displace the coupling member away from the casing 70. Since the lever arm 80 is attached to the coupling member 78, the right end of the arm 80 in FIGURE 4 becomes displaced away from the front wall of the casing 70. This tends to produce a displacement of the left end of the arm 80 toward the left in FIGURE 4. When the left end of the lever arm 80 becomes displaced toward the left in FIGURE 4, it produces a tension on the spring 82. This tension acts to pivot the movable arm of the switch 44 into engagement with the lower stationary contact in FIGURES 1 and 4.

Upon an engagement between the movable arm and the lower stationary contact of the switch 44 in FIGURE 1, either or both of the capacitances 52 and 54 become coupled electrically into the circuit of the oscillator 14 between the base and collector of the transistor 60. The coupling of this capacitive value between the base and collector of the transistor 60 causes the oscillator 14 to become operative. For example, the capacitance 52 becomes coupled into the oscillator 14 for the production of oscillatory signals when the button 72 is depressed at either the left end or the right end. As the oscillatory signals are produced by the oscillator 14, the capacitance 52 becomes charged by the flow of current through a circuit including the transistor 60, the tuned circuit formed by the capacitance 62 and the coil 64, the lower stationary contact and movable arm of the switch 44, the capacitance 52, the resistance 42, the transistor 36 and the choke coil 58.

Initially, the capacitance 52 may effectively present a short circuit between the base and collector of the transistor 60 since relatively little charge exists in the capacitance. This results from the fact that the switch 44 short circuits the capacitance 52 during the time that the movable arm of the switch engages the upper stationary contact of the switch. As the capacitance becomes charged, however, its effective impedance increases until it appears to present an open circuit at the time that it becomes fully charged. A high impedance is presented by the capacitance 52 when fully charged since current is not able to flow through the capacitance at this time.

When the impedance presented by the capacitance 52 becomes relatively high, the potential produced on the base of the transistor 60 as a result of the charge in the capacitance 52 approaches the potential produced on the emitter of the transistor 60. This causes the transistor 60 to become cut off and thereby prevents any further oscillatory signals from being produced by the oscillator 14. After the oscillator 14 has become cut off and the movable arm of the switch 44 is released into engagement with the upper stationary contact of the switch, the capacitance 52 discharges through the switch 44. Upon a discharge of the capacitance 52, the oscillator 14 is in a condition to produce subsequent oscillations upon a depression of one of the buttons 72 and 74 at either the left or right end of the button.

In the normal operation of the switches 30 and 32, each of the oscillators 10 and 12 is in series with the oscillator 14 through the transistor 36. When the switch 30 is opened by depressing the right side of the button 72 in FIGURE 2, the oscillator 10 becomes decoupled from the series circuit so that only the signals from the oscillator 12 can be introduced to the oscillator 14 to modulate the carrier signals produced by the oscillator 14. Similarly, the oscillator 12 becomes decoupled from the circuit when the left end of the button 72 in FIGURE 2 is depressed since the switch 32 becomes opened at that time.

As previously described, the capacitance 52 is coupled electrically into the circuit of the oscillator 14 when the button 72 is depressed at either the left or right end. This causes the oscillator 14 to produce signals for a first particular period of time. The oscillator 14 produces signals only for the first particular period of time when the right end of the button 74 is depressed since only the capacitance 52 is coupled into the circuit of the oscillator 14. Upon a depression of the left end of the button 74, however, the movable arm of the switch 50 is moved into engagement with the stationary contact of the switch so that both the capacitances 52 and 54 become inserted in a parallel relationship into the circuit of the oscillator 14.

Because of the increased capacitive value provided by the capacitances 52 and 54 in parallel, a longer time is required for the capacitances 52 and 54 to become charged than for the capacitance 52 alone. In this way, the oscillator 14 continues to produce signals for a second period of time greater than the first period of time. The durations of the first and second particular periods can be controlled by selecting the value of the capacitor 52 and the combined values of the capacitances 52 and 54.

The transmitter described above has certain important advantages. One advantage results from the controlled periods of time during which carrier signals are produced by the oscillator 14 for transmission toward the television receiver. These signals are produced for the controlled periods of time provided that the movable arm of the switch 44 is maintained in engagement with the lower stationary contact of the switch for the controlled period of time. However, signals are produced only for the controlled period of time even when the switch 44 is actuated for periods longer than the controlled period.

Another advantage results from the fact that the signals produced by the oscillator 14 have a constant amplitude throughout the complete duration of the first or second particular periods. This is advantageous since it enhances the operation of the receiver and simplifies the construction of the receiver. Furthermore, because of the production of oscillatory signals only for controlled periods of time and only when control over the operation of the television receiver is desired, the life of the battery 20 is considerably prolonged.

A third advantage results from the production of signals at either the first or second modulating frequencies or both the first and second modulating frequencies for first or second controlled periods of time.

Another advantage results from the use of a suitable carrier frequency such as approximately 27 megacycles. By using such a high frequency, the transmitting antenna does not have to be pointed toward the wireless remote control receiver in order to control the operation of the television receiver. This is important since it minimizes the concentration required of any television viewer, especially when he is talking or is concentrating on a program. In this respect, the system constituting this invention is different from other systems now in use. This results from the fact that the other systems require the remote control transmitter to be pointed toward the wireless remote control unit at the television receiver because of the low frequencies such as ultra-sonic frequencies used as the transmitting frequencies and because of other reasons which will be described subsequently.

Full details as to the construction and operation of the transmitter shown in FIGURE 1 are set forth in co-pending application Serial No. 766,438, filed October 10, 1958, by me.

*Wireless Remote Control Receiver*

The receiver shown in FIGURE 7 is disposed either at or in the television receiver to receive the signals transmitted from the unit shown in FIGURES 1 to 5, inclusive, and described above. The receiver includes an antenna 100 which is disposed in series with a coil 102. The coil 102 is magnetically coupled to a coil 104, which is in parallel with a capacitance 106 to form a tuned circuit resonant at the carrier frequency of the signals produced by the oscillator 14 in FIGURE 1. One terminal of the coils 102 and 104 and of the capacitance 106 is grounded. The capacitance 106 may have a value of approximately 10 micro-microfarads.

A capacitance 108 and a resistance 110 extend electrically in series from the ungrounded terminal of the capacitance 106 to ground. The capacitance 108 and the resistance 110 may respectively have values of 100 micro-microfarads and 47 kilo-ohms. The terminal common to the capacitance 108 and the resistance 110 is connected to the control grid of a tube 112, which may be included in a type 6X8 envelope.

The cathode and suppressor grid of the tube 112 are grounded, and a screen grid is connected to the movable arm of a potentiometer 114 and to a first plate of a capacitance 116, the second plate of which is grounded. The potentiometer 114, a resistance 118 and a capacitance 120 are in series, with one terminal of the potentiometer 114 and one plate of the capacitance 120 being grounded. The potentiometer 114, the resistance 118 and the capacitance 120 may respectively have values of 150 kilo-ohms, 22 kilo-ohms and 0.01 microfarad.

A capacitance 123, a resistance 124 and a tuned coil 126 are in parallel between the plate of the tube 112 and the terminal common to the resistance 118 and the capacitance 120. The terminal common to the resistance 118 and the capacitance 120 is also connected to a source of direct voltage 122 to receive a potential of approximately +140 volts from the source. The capacitance 123 and the resistance 124 may respectively have values of 10 micro-microfarads and 10 kilo-ohms, and the coil 126 may be adjustably tuned to resonate with the capacitance 123 at the carrier frequency of approximtaely 27 megacycles.

A coil 128 is magnetically coupled to the coil 126 and is connected between ground and the cathode of a diode 130, which may be a type 1N82A. A resistance 134 having a suitable value such as approximately 100 kilo-ohms extends electrically from the plate of the diode 130 to ground. A capacitance 136 and a resistance 138 are in series across the resistance 134 and may be respectively provided with values of 470 micro-microfarads and 10 megohms. The terminal common to the capacitance 136 and the resistance 138 is connected to the grid of a tube 140, which may be included in the same envelope as the tube 112. The cathode of the tube 140 is grounded.

A resistance 142 having a suitable value such as approximately 47 kilo-ohms is disposed electrically between the plate of the tube 140 and the source 122 to receive the potential of approximately +140 volts from the source. A capacitance 144 is connected electrically between the plate of the tube 140 and ground, and a capacitance 146 and a resistance 148 are in series across the capacitance 144. The capacitances 144 and 146 and the resistance 148 may respectively be provided with values of approximately 47 micro-microfarads, 220 micro-microfarads and one megohm. The grid of a tube 150 receives the signals produced on the terminal common to the capacitance 146 and the resistance 148, the cathode of the tube being grounded. The tube 150 may be included with a tube 152 in a type 12AT7 envelope.

The tube 152 is included in an amplifier stage corresponding to that which includes the tube 150. The signals produced on the plate of the tube 152 are introduced through a coupling capacitance 154 to the plate of a diode 156 and to the cathode of a diode 158. The diodes 156 and 158 may be included in a type IRC9KR22 envelope manufactured by the International Resistance Company. The cathode of the diode 156 is grounded and the plate of the diode 158 is connected to the voltage source 122 to receive a negative potential of approximately −2 volts. A capacitance 160 extends electrically from the plate of the diode 158 to ground.

The signals produced on the plate of the diode 156 and on the cathode of the diode 158 are introduced to the first plates of a pair of capacitances 162 and 164. The second plate of the capacitance 162 is connected to first terminals of a capacitance 166 and a coil 168. The capacitance 166 may be provided with a value of approximately 0.001 microfarad and the coil 168 may be adjustably tuned to pass the modulating signals having a frequency of 20 kilocycles per second. Similarly, the second plate of the capacitance 164 is connected to first terminals of a capacitance 170 and a coil 172. The capacitance 170 may be provided with a value of 0.0068 microfarad, and the coil 172 may be adjustably tuned to produce a resonant circuit with the capacitance at a modulating frequency of approximately 100 kilocycles per second. The second terminals of the capacitance 166, the coil 168, the capacitance 170 and the coil 172 are grounded.

The signals produced on the ungrounded terminals of the capacitance 166 and the coil 168 are introduced through a coupling capacitance 174 to the grid of a tube 176, which may be included with a tube 178 in a type 6CG7 envelope. The cathodes of the tubes 176 and 178 are grounded. A resistance 180 and a capacitance 182 are in series between the plate of the tube 176 and ground. The resistance 180 and the capacitance 182 may be respectively provided with values of approximately 18 kilo-ohms and 0.1 microfarad. Energizing means such as a relay coil 184 is connected at one end to the terminal common to the resistance 180 and the capacitance and at the other end is connected to the voltage source 122 to receive a positive potential of approximately +140 volts.

Resistances 186, 188 and 190 are in series between the grid of the tube 176 and the plates of a pair of diodes 192 and 194. The cathode of the diode 192 is connected to the terminal common to the resistances 188 and 190, as is one plate of a capacitance 196, the second plate of which is connected to the plate of the tube 176. A capacitance 198 is connected to the plates of the diodes 192 and 194 and at the other end to the terminal common to the resistances 186 and 188. A line 200 also extends from the terminal common to the resistances 186 and 188. The resistances 186, 188 and 190 may respectively have values of 220 kilo-ohms, 100 kilo-ohms and 2.2 megohms, and the capacitances 196 and 198 may respectively have values of 0.001 microfarad and 0.01 microfarad.

The tube 178 has electrical circuitry associated with it in a manner similar to that described above for the tube 176. For example, a resistance 202 and energizing means such as a relay coil 204 are in series between the plate of the tube 178 and a terminal in the source 122 for providing a positive potential of approximately +140 volts. The operation of the stage including the tube 178 is controlled by the introduction of signals through a coupling capacitance 206 from the ungrounded terminals of the capacitance 170 and the coil 172.

The signals transmitted by the unit shown in FIGURES 1 to 5, inclusive, and described above are received by the antenna 100, which is located at the television receiver. The signals received by the antenna 100 are introduced to the coil 102 and are induced by that coil in the coil 104. The signals are then introduced to the control grid of the tube 112 to obtain an amplification of the signals in the stage which includes that tube. This stage constitutes a radio frequency amplifier which is operative at the carrier frequency of the transmitter shown in FIGURES 1 to 5, inclusive. The band pass characteristics of the tuned circuit formed by the capacitance 123 and the coil 126 in the radio frequency amplifier are made fairly wide by including the resistance 124. The band pass characteristics are made fairly wide since the modulating frequencies of 20 kilocycles and 100 kilocycles are spaced relatively far apart in the frequency spectrum. The sensitivity of the radio frequency amplifier is controlled by a manual adjustment of the movable arm of the potentiometer 114 so that the effective range of the transmitted signals will be relatively limited. This is especially important for television installations in relatively crowed areas such as in apartment houses where remote control of a television receiver in one apartment should not affect the operation of television receivers in adjacent apartments.

The signals from the radio frequency (RF) stage are introduced through the transformer formed by the coils 126 and 128 to the detector stage which includes the diode 130. The detector stage operates to demodulate the signals having the carrier frequency of approximately 27 megacycles per second. The output signals from the diode 130 represent the modulating signals at the low frequency of approximately 20 kilocycles per second and at the high frequency of approximately 100 kilocycles per second. These signals are amplified by the stages which include the tubes 140, 150 and 152. Although three stages of amplification are shown, it should be appreciated that more or less stages of amplification may also be used.

The amplified signals from the stage including the tube 152 are introduced to the tuned circuit formed by the capacitance 166 and the coil 168 and to the tuned circuit formed by the capacitance 170 and the coil 172. The circuit formed by the capacitance 166 and the coil 168 is tuned to the low modulating frequency of 20 kilocycles per second so as to pass signals only at that frequency. Similarly, the circuit formed by the capacitance 170 and the coil 172 is tuned to pass signals only at the high modulating frequency of 100 kilocycles per second. In this way, the tuned circuits act to channelize the modulating signals of selected low and high frequencies into different channels.

The signals passed by the tuned circuits have amplitudes which have relatively narrow limits in accordance with the operation of the diodes 156 and 158. For example, signals having a positive amplitude above ground pass through the diode 156 to ground such that they are unable to be presented to the tuned circuits. Similarly, signals having a negative amplitude greater than −2 volts are absorbed by the action of the diode 158 so as to be prevented from being introduced to the tuned circuits.

The action of the diodes 156 and 158 in limiting the amplitudes of the signals introduced to the tuned circuits is important in obtaining the proper operation of subsequent stages as will become more apparent subsequently. Actually, the diodes 156 and 158 are biased at a potential approximating −1 volt because of the flow of leakage current through the diodes. The diodes then act to limit any signal swing to an amplitude of 1 volt on either side of the bias of −1 volt. It will be appreciated that adjustable controls may be included to vary the limiting action provided by the diodes 156 and 158 so that the limits in amplitude of the signals passed by the diode may vary from 2 volts.

The modulating signals passed by the capacitance 166 and the coil 168 are introduced through the coupling capacitance 174 to the control grid of the tube 176. These signals modulate the flow of current through a circuit including the voltage source 122, the relay coil 184, the resistance 180 and the tube 176. The resultant amplified alternating voltage produced on the plate of the tube 176 is fed back through the capacitance 196 to the cathode of the diode 192 for rectification by the diode. This positive rectified voltage is then smoothed and filtered by various members including the capacitance 198 and is then introduced from the resistance 186 to the control grid of the tube 176.

In this way, the alternating signal introduced from the tuned circuit formed by the capacitance 166 and the coil 168 to the control grid of the tube 176 is converted into a direct voltage having a voltage level proportionate to the amplitude of the alternating signal. As will be seen, the amplification of the alternating voltage and the production of an amplified direct voltage are accomplished in a single tube. This direct voltage causes a direct current to flow through the relay coil 184.

The limiting action provided by the diodes 156 and 158 is intrumental in preventing any ringing action from occurring in the tuned circuit formed by the capacitance 166 and the coil 168. If ringing did occur, for example, in the tuned circuit formed by the capacitance 166 and the coil 168 as a result of a pulse of large amplitude to the tuned circuit, it would prolong the time of response of this tuned circuit. This would tend to obliterate any distinction between unwanted signals of relatively short duration and desired signals of increased duration.

In like manner, the signals from the tuned circuit formed by the capacitance 170 and the coil 172 are introduced to the grid of the tube 178. These signals are then converted into a direct voltage having a level proportionate to the amplitude of the signals. This direct voltage is then used to energize the coil 204 to provide controls which will be described in detail subsequently.

The coil 204 becomes energized for only the proper period of time because of the limiting action provided by the diodes 156 and 158 in preventing any ringing from occurring in the tuned circuit formed by the capacitance 170 and the coil 172. At least some of the stages in the receiver described above and shown in FIGURE 7 are similar to corresponding stages in co-pending application Serial No. 707,603, filed January 7, 1958, by me. A full discussion as to the construction and operation of these stages is set forth in the co-pending application.

*Control Unit in Wireless Remote Control Receiver*

The relay coils 184 and 204 shown in FIGURE 7 are also shown in FIGURE 8. A pair of single-pole, double-throw switches 210 and 212 and a single-pole, single-throw switch 214 are magnetically coupled to the relay coil 184 so that their movable arms will become actuated when the coil becomes energized. The movable arms of the switches 210, 212 and 214 are grounded.

The right stationary contact of the switch 210 in FIGURE 8 is connected through a terminal 215 to the left stationary contact of a single-pole, double-throw switch 216 which is magnetically coupled to the relay coil 204. Similarly, a connection is made in FIGURE 8 from the left stationary contact of the relay coil 210 through a terminal 217 to the right stationary contact of the relay coil 216 in FIGURE 8, the movable arm of the switch 216 being grounded. The right stationary contact of the switch 210 in FIGURE 8 is also connected to a first terminal of the secondary winding in a transformer 220, the primary winding of which is connected to receive alternating voltage of approximately 115 volts from a suitable source such as a wall outlet.

The winding 222 of a motor generally indicated at 246 (FIGURE 10) and energizing means such as a relay coil 224 extend electrically in series to ground from the second terminal of the secondary winding in the transformer 220. A movable arm of a single-pole, single-throw switch 226 is magnetically coupled to the winding 222 of the motor 246 and is electrically grounded. A capacitance 228 and a relay coil 230 are connected in parallel between the stationary contact and movable arm of the switch 226. A resistance 232 is connected between the stationary contact of the switch 226 and a terminal in a source 234 of direct voltage. The source 234 provides the direct voltages for energizing the television receiver which is shown in FIGURE 6 and which will be described in detail subsequently. Because of this, the source 234 is different from the source 122 shown in FIGURE 7.

The movable arm of a single-pole, single-throw switch 236 is magnetically coupled to the relay coil 230 and is electrically grounded. The stationary contact of the switch 236 is connected to first terminals in a pair of windings 240 and 242 which are included with the winding 222 in the motor 246 in FIGURE 10. When energized, the winding 240 causes the motor 246 to rotate in one direction, and the winding 242 causes the motor to rotate in the opposite direction when the winding is energized. The second terminals of the windings 240 and 242 are respectively connected to the left and right stationary contacts of the switch 212 in FIGURE 8.

The movable arms of a pair of single-pole, single-throw switches 250 and 252 and of a single-pole, double-throw switch 254 are magnetically coupled to the relay coil 224. The switches 250 and 252 are constructed so that their movable arms will return to engagement with the stationary contacts of the switches when the relay coil 224 becomes de-energized. However, as will be described in detail subsequently, the switch 254 has a bi-stable operation such that the movable arm remains in its position of actuation even after the relay coil 224 becomes de-energized.

The movable arm of the switch 250 is electrically connected to the left stationary contact of the switch 210 and the right stationary contact of the switch 216 in FIGURE 8. The stationary contact of the switch 250 has a common connection with the winding 222 and the relay coil 224. The stationary contact of the switch 252 is grounded, and the movable arm is connected to first terminals of a capacitance 256 and a relay coil 258, second terminals of which are grounded. The stationary contact of a normally open single-pole, single-throw switch 263 is connected to the ungrounded terminal of the relay coil 258, and the movable arm of the switch is grounded.

The movable arm of the switch 254 is connected to one stationary contact of a manually adjustable rheostat 261, the movable arm and second stationary contact of which is grounded. No electrical connection is made to the right stationary contact of the switch in FIGURE 8, and the left stationary contact of the switch 254 is connected to one terminal of a voice coil 259, the other terminal of which may be grounded.

The capacitance 256 and the relay coil 258 are adapted to receive a direct voltage through a resistance 260 from the voltage source 122 also shown in FIGURE 7. In this way, the voltage source 122 provides power for the remote control receiver shown in FIGURE 7 and for most of the control unit shown in FIGURE 8 without providing any power for operating the television receiver shown in FIGURE 6.

The movable arm of a bistable switch 262 corresponding to the bistable switch 254 is coupled to the relay coil 258. The switch 262 serves as the master switch for controlling the introduction of electrical energy to the various stages in the television receiver shown in FIGURE 6. Thus, one stationary contact of the switch 262 is connected in the television receiver shown in FIGURE 6 to control the energizing of these stages. The movable arm of the switch 262 is electrically connected to the upper stationary contact in FIGURE 8 of a single-pole, double-throw switch 266.

The movable arm of the switch 266 is grounded, and the lower stationary contact of the switch in FIGURE 8 is connected to the terminal common to the winding 222 and the relay coil 224. The movable arm of the switch 266 is ganged to the movable arms of single-pole single-throw switches 268 and 270. The stationary contact of the switch 268 is grounded, and the movable arm is connected to the right stationary contact of the switch 210 and the left stationary contact of the swich 216 in FIGURE 8. A connection is made from the stationary contact of the switch 270 to the line 200 (also shown in FIGURE 7) and from the movable arm of the switch 270 to the stationary contact of the switch 214.

FIGURE 9 illustrates the construction and relative disposition of various controls in the television receiver for affecting the operation of the receiver. As will be seen from FIGURE 9, certain knobs and buttons are disposed on the front cover of the television receiver to provide various manual adjustments in the operation of the receiver. For example, a button 300 is supported on a front cover 302 for depression at either end of the button to change the channel being selected for reception in any instant. It will be appreciated that the button 300 can be replaced by two different buttons since the button 300 controls two different operations.

A knob 304 may also be disposed on the front cover 302 to adjust the sound in the television receiver in accordance with rotary movements of the knob and to turn the television receiver on or off upon a depression of the knob. The rheostat 261 (also shown in FIGURE 8) for controlling the intensity of the sound and a rheostat 305 for controlling the tone of the sound are mechanically coupled to the knob 304 to vary the characteristics of the sound in accordance with the rotation of the knob. Other knobs such as knobs 306 and 308 may also extend through the cover 302 to provide such controls as adjusting the brightness of the picture being presented to the viewer and adjusting the "vertical hold" signal to lock the picture into a rectilinear representation.

The right end of the button 300 in FIGURE 9 is disposed in coupled relationship to an armature 311 associated with a solenoid 313 so as to actuate the armature when the right end of the button 300 is depressed. In this way, the manual depression of the right end of the button 300 has an effect on the armature 311 corresponding to that which is produced when the solenoid 313 is energized. The button 300 is mechanically coupled at a center position to the switch 263 so as to close the switch when the button is depressed at the center position. In like manner, the left end of the button 300 is mechanically coupled to an armature 315 associated with a solenoid 317 so as to actuate the armature when the left end of the button is depressed.

Each of armatures 310 and 314 in FIGURE 13 is pivotable about a fulcrum at one end of the armature when the armature becomes actuated. The armatures 310 and 314 are so disposed that the armature 310 is pivotable in a clockwise direction in FIGURES 12 and 13 and the armature 314 is pivotable in a counter clockwise direction in these figures. The armature 310 is hooked inwardly at its free end to form a pawl 320 which is disposed in contiguous relationship to a ratchet 322 (FIGURES 13 and 14). Similarly, the armature 314 is hooked inwardly at its free end to define a pawl 324 which is disposed in contiguous relationship to a ratchet 326 (FIGURES 13 and 15).

As will be seen from FIGURES 14 and 15, the ratchet 322 is adapted to rotate in a clockwise direction and the ratchet 326 is adapted to rotate in a counter clockwise direction. The ratchets 322 and 326 are fixedly mounted on a shaft 328 which is journalled into an annular casing 330 preferably made from a translucent plastic material. As will be seen from FIGURES 9 and 16, numerical indications are provided at spaced intervals around the annular periphery of the casing 330 to correspond to the different channels capable of being received by the television receiver.

A light bulb 332 is fixedly mounted within the casing 330 in contiguous relationship to the casing to illuminate the number of the channel being selected for reception at any instant. In this way, the apparatus shown in FIGURES 12 to 16, inclusive, serves as a channel indicator 59, showing visually a particular channel for the reception of television signals at any instant.

As previously described, the switch 262 (FIGURES 8 and 9) is provided with a bistable operation to control turning the television receiver on and off. The switch 262 is manually coupled to the knob 304 so that the television receiver can be turned on or off by a manual depression of the knob. This is accomplished by coupling the button 304 through a shaft 340 to an armature 341, which is magnetically coupled to the relay coil 258 and which is disposed for pivotal movement.

The switch 262 may be constructed in a manner similar to the switch 254, important elements of which are shown somewhat schematically in FIGURE 11. The opening and closure of the switch 254 is controlled by a pivotable armature 343 (FIGURE 9a) which corresponds to the armature 341 associated with the switch 262. The armature 343 associated with the switch 254 is coupled to one end of an arm 342 (FIGURES 9a and 11), the other end of which carries a pawl 344 (FIGURE 11). The pawl 344 is disposed in operative relationship to a ratchet 346 which carries a polygonal cam 348. For example, the cam 348 may be provided with a peripheral configuration in the form of an equilateral hexagon and may be disposed to engage the movable arm of the switch 254 shown in FIGURES 8, 9a and 11.

As will be seen in FIGURE 9a, an arm 350 is coupled to the armature 343 on the diametrically opposite side of the relay coil 224 from the arm 342 and is provided with a configuration corresponding to that of the arm 342. The arm 350 engages the movable arms of the switches 250 and 252 so as to pivotably move these arms into engagement with the stationary contacts of the switches when the movable arms of the switches become actuated. In this way, the bistable switch 254 is disposed for proper operation on one side of the relay coil 224, and the single-pole, single-throw switches 250 and 252 are disposed for proper operation on the other side of the relay coil.

The motor 246 shown in FIGURE 10 is adapted to drive a disc 360 having lobes 362 at spaced positions around the annular periphery of the disc. A number of lobes 362 are provided on the annular periphery of the disc to correspond to the number of channels capable of being selected by the television receiver. The movable arm of a single-pole, double-throw switch 364 is disposed in coupled relationship to the lobes 362 on the disc 360 so as to be actuated upwardly or downwardly as the disc rotates and in accordance with the direction of rotation of the disc. One stationary contact of the switch 364 is connected to the solenoid 312 (FIGURES 12 and 13) and the other stationary contact is connected to the solenoid 316 to obtain an energizing of the associated solenoid when the switch becomes closed.

A plurality of pins 368 extend axially through the disc 360 at positions corresponding to the disposition of the lobes 362 on the disc. The number of pins 368 extending through the disc 360 correspond to the number of channels capable of being selected in the television receiver. As will be seen in FIGURE 10, each of the pins 368 is provided with a shank portion and a head portion. Certain of the pins have their shank portions extending only partially through the disc, whereas the other pins are inserted into the disc so that the head portions abut the disc. The particular pins disposed with their heads in abutting relationship to the disc correspond to the channels which are available for the reception of signals in any particular locality. For example, in the Los Angeles area the pins corresponding to channels 2, 4, 5, 7, 9, 11 and 13 are disposed with their heads in abutting relationship to the disc 360, and the other pins are disposed with their head portions displaced from the disc. The movable arms of the switches 266, 268 and 270 (FIGURE 8) are disposed in the path of rotary movement of the pins which have their head portions in abutting relationship to the disc 360.

A television receiver generally indicated at 370 is shown somewhat schematically in FIGURE 17. The television receiver includes a cabinet 372 and a picture tube 374 and may also include a visual display 376 for providing a remote indication as to the particular channel selected for reception at any instant. The visual display 376 is shown on an enlarged basis in FIGURES 18 and 19. It includes a translucent screen 378 made from glass or a suitable plastic material such as that having the trademark designation of "Lucite." The visual display may be included in addition to the channel selector shown in FIGURES 9 and 10 and described above, or it may be included in the television receiver in place of the channel selector shown in FIGURES 9 and 10.

Numerical indications corresponding to the numbers of the different channels in the television receiver are disposed at successive positions on the screen 378, as may be best seen in FIGURE 19. A plurality of light bulbs 380 are provided, each disposed behind a different number on the screen. The light bulbs are connected to successive stationary contacts of a stepping switch 382 (FIGURE 20) which is mechanically coupled to the shaft 328 (also shown in FIGURE 13). The movable arm of the stepping switch 328 is connected to receive an alternating voltage such as 6.3 volts from a transformer.

As previously described, the channel selector represented by the disc 360 becomes advanced in the forward direction when signals at only the modulated frequency of 20 kilocycles per second are transmitted. These signals are effective in energizing the coil 184 (FIGURES 7 and 8). Similarly, only the coil 204 becomes energized to move the channel selector in the reverse direction when signals at the modulating frequency of 100 kilocycles per second but not at the modulating frequency of 20 kilocycles per second are produced. The sound from the television receiver is muted or restored when signals at both modulating frequencies are transmitted for a first particular period of time. The television set is turned on or off when signals at both the modulating frequency of 20 kilocycles per second and 100 kilocycles per second are transmitted for a second particular period of time greater than the first particular period of time.

When either one of the coils 184 and 204 is energized and the other coil remains de-energized, both the terminals 215 and 217 in FIGURE 8 become grounded. This causes a continuous circuit to be established which includes the terminal 215, the secondary winding of the transformer 220, the winding 222 of the motor 246, the stationary contact and movable arm of the switch 250, the terminal 217, and one of the switches 210 and 216. Upon the establishment of such a continuous circuit, the winding 222 becomes energized so as to actuate the movable arm of the switch 226 away from the stationary contact of the switch.

When the movable arm of the switch 226 becomes actuated, the short circuit provided by the switch across the capacitance 228 and the coil 230 becomes opened. This causes current to flow through a circuit which includes the voltage source 234 in the television receiver, the resistance 232 and the capacitance 228 and the coil 230 in parallel. As will be seen, the continuous circuit can be established only when the television receiver is on since the voltage source 234 forms a part of the television receiver. This prevents the station selector from being advanced either in the forward direction or in the reverse direction unless the television set has been turned on.

When the continuous circuit set forth in the previous paragraph is completed, the flow of current occurs initially through the capacitance 228 so as to charge the capacitance. After a particular period of time dependent upon the value of the capacitance, the capacitance becomes sufficiently charged so that a current of relatively large magnitude can flow through the coil 230 to energize the coil. By providing a delay in the energizing of the coil 230, assurance is obtained to indicate that signals at only one of the modulating frequencies is being transmitted. This is desirable since the station selector should be advanced only when signals at either the low modulating frequency or the high modulating frequency are being transmitted but not when signals at both the low and high modulating frequencies are simultaneously transmitted.

When the coil 230 becomes energized, the switch 236 becomes closed. This establishes a continuous circuit through either the winding 240 or the winding 242 in the motor 246. The winding 240 becomes energized when only the coil 204 is energized, since the movable arm of the switch 212 continues to engage the left stationary contact of the switch in FIGURE 8 at such time. Because of the simultaneous energizing of the winding 222 and the winding 240, the motor 246 rotates in a counter clockwise direction in FIGURE 10 to change the channel being received by the television receiver. For example, the motor 246 may operate to change the channel being received from channel "4" to channel "3" and then to channel "2." The channel is changed by activating a different tuned circuit in the television receiver every time that the disc 360 in FIGURE 10 becomes rotated through an angular distance between adjacent pins 368. Each tuned circuit is tuned to the frequency of transmission of a different channel.

When the coil 184 becomes energized but not the coil 204, the movable arm of the switch 212 becomes actuated into engagement with the right stationary contact of the switch in FIGURE 8. Since the winding 222 also becomes energized, the motor 246 operates in a clockwise direction in FIGURE 10. Upon the operation of the motor 246 in the clockwise direction, the disc 360 becomes rotated in a direction in which the channels become advanced from low numbers to high numbers.

As the disc 360 rotates in the clockwise direction in FIGURE 10, each lobe 362 on the disc actuates the movable arm of the switch 364 into engagement with the upper stationary contact in FIGURE 10. Each engagement between the movable arm and the upper stationary contact of the switch 364 in FIGURE 10 occurs only on an instantaneous basis. Every time that the movable arm of the switch 364 engages the upper stationary contact of the switch in FIGURE 10, the solenoid 312 in FIGURE 13 becomes energized and actuates the armature 310 to produce a pivotal movement of the armature. When the armature 310 becomes actuated, the hooked portion 320 at the end of the armature moves into engagement with the ratchet 322 so as to advance the ratchet through an angular distance equivalent to the angular distance between adjacent channels on the channel indicator represented by the casing 330. The ratchet 322 in turn drives the shaft 328 and the casing 330 so that the next integer appears on the casing above the light bulb 332. For example, the channel indicator represented by the casing 330 may become advanced from channel "2" to channel "3" so that channel "3" becomes illuminated by the light bulb 332.

The movable arm of the stepping switch 382 in FIGURE 20 may also be coupled to the shaft 328 for movement with the shaft. The movable arm of the stepping switch 382 completes a circuit to a particular one of the light bulbs 380 in accordance with the stationary contact engaged by the movable arm at any instant. Because of this, the light bulbs become illuminated in a sequential pattern as the movable arm of the stepping switch 382 becomes advanced so that illuminations of successive numbers in the visual display 376 are obtained. By way of illustration, the integer "3" may become illuminated in the visual display 376 as the movable arm of the stepping switch 382 becomes advanced in the forward direction from the second stationary contact to the third stationary contact of the switch.

Once the disc 360 starts to rotate, it continues to rotate until one of the pins 368 in FIGURE 10 engages the movable arms of the switches 266, 268 and 270 (FIGURE 8). As previously described, only particular pins are moved into position to engage the movable arms of the switches 266, 268 and 270. These pins correspond to the channels available for reception of signals in a given locality. When one of the pins 368 engages the movable arms of the switches 266, 268 and 270, circuits are broken to interrupt the operation of the motor 246 and the rotation of the disc 360, as will be described in detail immediately hereafter.

The switches 268 and 270 remain closed while the motor 246 is rotating, and the movable arm of the switch 266 engages the upper stationary contact in FIGURE 10 during the same period. During the time that the movable arm of the switch 268 is engaging the stationary contact in FIGURE 8, a ground potential is established through the switch to the upper terminal of the secondary winding in the transformer 220. At the same time, the movable arm of the switch 266 engages the lower stationary contact in FIGURE 8 so that a ground connection is established to one terminal of the motor winding 222. This causes the continuous circuit initially established through the secondary winding of the transformer 220 and the motor winding 222 to be maintained even after the energizing of the relay coil 204 may have become interrupted. Since the switch 236 becomes closed when the motor winding 222 becomes energized, the circuit through the winding 242 is maintained even after the coil 204 becomes de-energized. By maintaining the windings 222 and 242 energized in this manner, the motor 246 drives the disc 360 until the next pin 368 actuates the movable arms of the switches 266, 268 and 270 to open the switches 268 and 270 and to produce an engagement between the movable arm and the lower stationary contact of the switch 266 in FIGURE 8.

At certain times, only the coil 184 may have been initially energized to produce an advance of the channel selector in the forward or clockwise direction. When this occurs, the coil 184 is maintained energized even after the transmission of signals at the lower modulating frequency of 20 kilocycles per second has been discontinued. The coil 184 continues to be energized through a holding circuit which is established through the switches 214 and 270 and the line 200 in FIGURES 7 and 8 to the grid of the tube 176 in FIG. 7. This holding circuit establishes a ground potential on the grid of the tube 176 to maintain the flow of current through the tube and through the coil 184.

By continuing to energize the coil 184, the movable arms of the switches 210, 212 and 214 are maintained in their actuated positions in FIGURE 8 such that the movable arm of the switch 212 continues to engage the right stationary contact of the switch. This establishes a continuous circuit through the winding 242 so that the motor 246 rotates to advance the channel selector in the forward direction. The motor 246 continues to operate until the movable arm of the switch 270 is actuated by the next pin 368 (FIGURE 10) which is disposed in position to engage the movable arm. At that time, the holding circuit establishing a ground potential on the grid of the tube 176 in FIGURE 7 is interrupted so that the flow of current through the tube and the relay coil 184 becomes discontinued.

At certain times, both the relay coils 184 and 204 may become simultaneously energized. This causes the ground potential to the terminal 217 in FIGURE 8 to become interrupted so that a ground potential cannot be established through the switch 250 to the left end of the winding 222 in that figure. Since a ground potential is produced through the switch 210 at the terminal 215, a continuous circuit is established which includes the secondary winding of the transformer 220, the motor winding 222 and the relay coil 224. The impedance provided by the relay coil 224 is considerably greater than that provided by the motor winding 222. Because of this, an insufficient potential is produced across the motor winding 222 to energize the motor. By preventing the motor winding 222 from becoming energized in this manner, the short circuit produced across the relay coil 230 by the switch 226 is maintained. This causes the switch 236 to remain open so that neither the motor winding 240 nor the motor winding 242 can become energized. This prevents the motor 246 from rotating to drive the disc 360 for a change in the channel being received by the television receiver at any instant when both signals are received simultaneously.

When the relay coil 224 becomes energized, it actuates the movable arms of the switches 250 and 252 to open these switches. By opening the switch 250, the relay coil 224 remains energized even if either the relay coil 184 or the relay coil 204 should become de-energized. This results from the fact that the opening of the switch 250 prevents a ground potential from being produced at the motor winding 222 even when one of the relay coils 184 and 204 becomes de-energized. In this way, the relay coil 224 remains energized until both the relay coils 184 and 204 become de-energized to interrupt the ground potential at the terminal 215.

Upon the energizing of the relay coil 224, the armature 343 becomes actuated to pivot the arm 342 in a counter clockwise direction in FIGURES 9a and 11. This causes the pawl 344 to drive the ratchet 346 in a clockwise direction through an angular distance of one tooth on the ratchet. The ratchet 346 in turn drives the cam 348, which controls the positioning of the movable arm of the switch 254. Upon the first actuation of the cam 348, an apex between two flat sides of the cam engages the movable arm of the switch 254 to position the movable arm in engagement with the stationary arm of the switch. When the cam 348 is again driven, the movable arm of the switch 254 rests against one of the flat hexagonal sides of the cam 348 so that the movable arm 254 is displaced away from the stationary contact of the switch. In this way, the switch 254 has a bistable operation in which it remains closed after the first energizing of the relay coil 224 and remains open after a second energizing of the relay coil 224.

When the switch 254 is open, a potential is produced across the voice coil 259 in FIGURE 8 in accordance with the amplitude of the potential introduced to the voice coil to represent the sound. In this way, sound with an intensity corresponding to the amplitude of the potential introduced to the voice coil is obtained. However, the voice coil becomes effectively shunted by the rheostat 261 when the switch 254 becomes closed. This limits the sound which is obtained from the television receiver in accordance with the positioning of the movable arm in the rheostat 261. The resultant variable control is thereby provided to reduce the intensity of the sound upon a first operation of the switch 254 and to restore the sound upon a second operation of the switch. The sound may even be muted entirely when the movable arm of the rheostat 261 engages the left end terminal of the rheostat 261 in FIGURE 8.

As previously described, the switch 252 in FIGURE 8 becomes opened when the relay coil 224 is energized so that the capacitance 256 and the relay coil 258 can no longer be bypassed by the switch. After a delay resulting from the charging of the capacitance 256, the relay coil 258 becomes energized to operate the bistable switch 262. As will be seen, the relay coil 258 can become energized whether or not the television receiver is on since the coil is energized from the voltage source 122 which is included in the remote control receiver shown in FIGURE 7 and described above.

Since the switch 262 may be constructed in a manner similar to that described above for the switch 254, it will also have a bistable operation. This causes the switch 262 to become opened upon alternate actuations of the switch and to become closed upon the other actuations of the switch. As previously described, the switch 262 is included as a master switch in the television receiver 370 (FIGURE 17) to turn the receiver on and off.

In addition to the controls which may be provided over the operation of the television receiver 370 from a position remote from the receiver, similar controls may be manually operated at the receiver. For example, the television receiver can be turned on upon a first depression of the knob 304 in FIGURE 9 and can be turned off upon a second depression of the knob. Upon depression, the knob 304 causes the armature 341 to become pivoted so that the bistable switch 262 changes from an open state to a closed state and vice versa. Similarly, when the knob 304 is rotated, the characteristics of the sound from the television receiver become altered because of an adjustment in the positioning of the movable contact in the rheostat 261 (also shown in FIGURE 8).

Channel selection at the television receiver 370 can also be manually obtained by a depression of the button 300. This results from the fact that the movable arms of the switches 210, 212 and 214 in FIGURE 8 are mechanically coupled to the right end of the button 300 so as to be actuated upon a depression of the right end of the button. Similarly, the movable arm of the switch 216 is mechanically coupled to the left end of the button 300 for actuation upon a manual depression of the left end of the button. By providing this arrangement, the button 300 in effect is placed in parallel with the relay coils 184 and 204 since the depression of the button causes the same switches to close as an energizing of the relay coils. As previously described, the motor becomes energized to drive the channel selector in one direction upon a closure of the switches 210, 212 and 214 and in the opposite direction upon a closure of the switch 216.

When the button 300 is depressed at the center position, it causes the movable arm of the switches 210, 212 and 214 to be actuated into engagement with the right stationary contacts in FIGURE 8 and the movable arm of the switch 216 to be actuated into engagement with the left stationary contact in that figure. This causes the intensity of the sound produced in the receiver to be controlled in a manner similar to that described above. At the same time, the switch 263 is closed to short circuit the relay coil 258 such that the bistable switch 262 cannot be actuated. In this way, the intensity of the sound can be controlled by the actuation of the button 300 but the television receiver cannot be turned on or off by the actuation of this button.

The control apparatus described above has an important advantage over the control apparatus now in use. This results from the fact that the manual controls at the receiver can supersede the remote controls at any time and vice versa. Furthermore, the manually operated buttons and knobs at the receiver control the same switches as those which are controlled by the remote control unit. In other control apparatus now in use, however, the television receiver must be set either to manual control or to remote control so that complete flexibility in control cannot be attained. When the television receiver is set to manual control, it cannot be remotely controlled. Similarly, the television receiver cannot be manually controlled when it is set to remote control.

*Television Receiver*

A somewhat schematic block diagram of a television receiver is shown in FIGURE 6. The system includes an antenna 400 and a radio frequency (RF) amplifier 402 connected to the antenna to receive the signals from the antenna. The frequency of the signals passed by the RF stage 402 is dependent upon the particular channel being selected at any instant, whether by the remote control apparatus described above and constituting this invention or by the manually operated knobs shown in FIGURE 9 and located at the television receiver. The tuner controlling the frequency of the signals passing through the RF amplifier 402 is illustrated at 403 in FIGURE 6.

A detector 404 receives signals from the amplifier 402 and from a local oscillator 406 and beats the received signals with the signals of reduced frequency from the oscillator to produce signals at an intermediate frequency. The signals from the detector 406 are introduced to an intermediate frequency amplifier 408 for obtaining an amplification of only the intermediate frequency signals. The intermediate frequency signals are then introduced to the second detector stage 410.

The signals from the detector 410 pass to a frequency discriminator 412, which converts the frequency modulated audio signals into corresponding amplitude modulations. The amplitude modulated signals are amplified by a stage 414, and the output signals from the amplifier are introduced to a loudspeaker 416. The intensity of the sound from the loudspeaker 416 is controlled by the voltage across the rheostat 261 (also shown in FIGURE 8). When the button 72 in FIGURE 2 is depressed, the intensity of the sound may be reduced a particular value dependent upon the setting of the movable arm in the rheostat 261, or the intensity of the sound may be adjusted gradually by a rotation of the knob 304 in FIGURE 9 and without a depression of the button 72.

The signals from the detector 410 are also amplified by a stage 420, which is tuned to the video frequency. The amplified video signals are then introduced to the picture tube 374 (also shown in FIGURE 17). The signals from the detector 410 also pass to a sync separator stage 422 which operates to clip the signals so that only the signals above a particular amplitude can pass through the stage. This clipping amplitude is chosen so that only the signal providing a reference in each complete scan of a picture frame is able to pass through the stage 422. The sync signal passing through the stage 422 triggers the horizontal sweep circuit 424 and the vertical sweep circuit 426. These circuits produce signals having sawtooth waveforms, the signals being introduced to the picture tube 374 to provide a scan of the complete face of the tube in each picture frame.

The source 234 (also shown in FIGURE 8) of direct voltage is also included to supply power to the different stages shown in FIGURE 8. The bistable switch 262 is connected between the voltage source 234 and the different stages to control the introduction of energizing voltage to the different stages. As previously described, the bistable switch 262 becomes opened upon a first actuation and remains opened until a second actuation. After the second actuation, the bistable switch 262 remains closed until a third actuation. In this way, the television receiver alternately becomes turned on and off.

Second Embodiment

The embodiment shown in FIGURES 21 to 25, inclusive, uses three frequencies instead of two frequencies as in the embodiment shown in FIGURES 1 to 20, inclusive. The transmitter for the second embodiment is shown in FIGURES 21 to 24, inclusive, and is provided with an oscillator corresponding to the oscillator 14 shown in FIGURE 1. The transmitter shown in FIGURES 21 to 24, inclusive, is also provided with a second oscillator generally indicated at 500 corresponding to either the oscillator 10 or the oscillator 12 in FIGURE 1.

The oscillator 500 is adapted to produce modulating signals at a first frequency such as 88 kilocycles per second when only a capacitance 502 is connected in parallel with a coil 504 in the oscillator. This occurs when the switch 30 (also shown in FIGURE 1) is actuated. Similarly, a capacitance 506 is placed in parallel with the coil 504 upon the actuation of the switch 32 (also shown in FIGURE 1) so as to obtain the production of modulating signals at a second frequency such as 73 kilocycles per second.

Both the capacitances 502 and 506 are placed in parallel with the coil 504 when the button 74 shown in FIGURE 2 is depressed at one of its ends. This causes modulating signals at a third frequency such as 57 kilocycles per second to be produced by the oscillator 500. Modulating signals at the different frequencies mentioned above are produced when the capacitances 502 and 506 respectively have values of 0.003 and 0.005 microfarad.

The signals at the third modulating frequency of 57 kilocycles per second are produced for a relatively short time upon the depression of the right end of the button 74 in FIGURE 2 so as to control the intensity of sound in the receiver. Signals are produced for an increased length of time at the modulating frequency of 57 kilocycles per second when the left end of the button 74 is depressed. As previously described, the production of signals for the increased duration of time controls the turning of the television receiver on or off.

The embodiment of the transmitter shown in FIGURES 21 to 24, inclusive, also includes features for providing an omni-directional radiation of the signals produced by the transmitter. This includes a coil 510 (FIGURES 22 and 23) corresponding to the coil 64 in FIGURE 1. The coil 510 may be helically wound and may be disposed within a casing 512 (FIGURE 24) which may be formed from a dia-magnetic and electrical insulated material such as plastic. A printed circuit (FIGURES 22, 23 and 24) is formed on a paper 514 which is disposed against the casing 512. The printed circuit may be provided with a plurality of turns to form a coil 516 (FIGURE 23). The coil 516 communicates electrically at its inner end with a first plate 518 forming a part of the printed circuit. A second plate 520 is disposed on the other side of the paper 514 to form a capacitance 522 with the plate 518. The coil 516 and the capacitance 522 are tuned to the frequency of the signals produced by the oscillator 14.

The signals produced by the coil 510 are introduced to the tuned circuit formed by the coil 516 and the capacitance 522. This results from the magnetic coupling between the coils 510 and 516 and the capacitive coupling between the coil 510 and the plate 518 forming a part of the capacitance 522. Both the coils 510 and 516 serve as antennas to radiate signals from the transmitter toward the television receiver shown in FIGURE 7. Since the coils 510 and 516 are disposed in substantially perpendicular planes, the signals radiated by the coils 510 and 516 have an omni-directional pattern. Because of this omni-directional pattern, the casing 512 housing the transmitter shown in FIGURE 21 does not have to be pointed in any particular direction in order for the receiver shown in FIGURE 7 to receive the signals. This advantage is obtained by the inclusion of the thin sheet of paper 514 in the casing 512.

FIGURE 25 illustrates a modification of the receiver shown in FIGURE 7, this modification being provided to make the receiver compatible with the transmitter shown in FIGURE 21. In the receiver shown in FIGURE 25 a first tuned circuit generally indicated at 530 is provided to pass signals at the first modulating frequency of 88 kilocycles per second. This tuned circuit corresponds to that provided by the capacitance 170 and the coil 172 in FIGURE 7. Similarly, a second tuned circuit generally indicated at 532 is provided in FIGURE 25 to pass signals at the modulating frequency of 73 kilocycles per second. This tuned circuit corresponds to the tuned circuit formed by the capacitance 166 and the coil 168 in FIGURE 7.

The tuned circuits 530 and 532 are connected to the first terminal of a tuned circuit generally indicated at 534, the second terminal of which is grounded. The tuned circuit 534 is resonant at the modulating frequency of 57 kilocycles per second. By providing this arrangement, modulating signals of 88 kilocycles per second are introduced from the tuned circuit 530 to the grid of the tube 178 (also shown in FIGURE 7), and the modulating signals of 73 kilocycles per second are introduced to the tube 176 (also shown in FIGURE 7). In this way, the signals of the modulating frequency of 88 kilocycles per second obtain an advance of the television selector in the forward direction and the signals at 73 kilocycles per second obtain an advance of the television selector in the reverse direction.

The signals at the third modulating frequency of 57 kilocycles per second pass to the tuned circuit 534. Since both the tuned circuits 532 and 534 have low impedances at the modulating frequency of 57 kilocycles per second, the signals from the tuned circuit 534 then divide substantially equally between the branches formed by the tuned circuits 530 and 532 so as to be introduced to the grids of the tubes 176 and 178. In this way, the signals at the third modulating frequency of 57 kilocycles per second cause current to flow through both the tubes 176 and 178 for an energizing of both the coils 184 and 204 in FIGURE 8. This causes the intensity of the sound in the television receiver to be controlled or the television receiver to be turned on or off or both actions to occur depending upon the duration of the signals at the modulating frequency of 57 kilocycles per second. By providing the arrangement shown in FIGURE 25, three modulating frequencies can be used instead of two with a minimum modification to the receiver

What is claimed is:

1. In combination, means including first and second oscillators and including first switching means operative upon the signals from the oscillators to simultaneously provide for a first particular period of time first oscillatory signals having a first frequency and second oscillatory signals having a second frequency different from the first frequency, means including the first and second oscillators and including second switching means operative upon the signals from the oscillators to simultaneously provide the first and second signals for a second particular time different from the first particular time, means including first relay means responsive only to the first and second signals of first duration to provide a first control, and means including second relay means responsive only to the first and second signals of second duration and operatively coupled to the first relay means to provide a second control different from the first control.

2. In combination: a transmitter including, means for providing signals having a first frequency, means for providing signals having a second frequency, first means coupled to the signal means for providing a controlled generation of signals at the first frequency, second means coupled to the signal means for providing a controlled generation of signals at the second frequency, third means coupled to the signal means for providing a controlled and simultaneous generation of signals at the first and second frequencies for a first particular period of time, fourth means coupled to the signal means for providing a controlled and simultaneous generation of signals at the first and second frequencies for a second particular period of time longer than the first particular period of time; and a receiver including, means responsive to the signals at only the first frequency from the transmitter for providing a first control, means responsive to the signals at only the second frequency from the transmitter for providing a second control, means responsive to signals simultaneously transmitted at both the first and second frequencies from the transmitter only for the first particular period of time for providing a third control, and means responsive to signals simultaneously transmitted at both the first and second frequencies from the transmitter only for the second particular period of time for providing a fourth control.

3. In combination for controlling the operation of a television receiver having electrical stages for providing a picture and electrical stages for providing sound to accompany the picture and having an electrical switch for turning the set on and off, means for receiving transmitted signals, a first duration to control the muting of sound and having a second duration to represent an operation of the on-off switch, first means including first relay means coupled to the receiving means and including first switching means controlled by the first relay means in accordance with the energizing of the first relay means for operating upon the electrical stages controlling sound to reduce the intensity of the sound only upon alternate receptions of signals having the first duration and to restore the sound only upon the other receptions of signals having the first duration, second means including second relay means coupled to the first relay means for energizing only upon the energizing of the first relay means and only upon the reception of the signals having the second duration and including second switching means controlled by the second relay means in accordance with the energizing of the first relay means for operating upon the on-off switch to turn the television receiver off upon alternate receptions of signals having the second duration and to turn the set on upon the other receptions of signals having the second duration, and means operatively coupled to the first and second means for preventing the intensity of the sound from being reduced or restored upon the reception of the signals for the second duration.

4. In combination for controlling the operation of a television receiver having a plurality of channels and having a selector for the different channels and having electrical stages for providing a picture and having electrical stages for providing sound to accompany the picture and having an electrical switch for turning the set on and off, oscillatory means for providing oscillatory signals, means including switching means coupled to the oscillator and including reactance means coupled to the switching means in accordance with the operation of the switching means for controlling the period of time during which oscillatory signals are produced for transmission, means coupled to the last mentioned means for transmitting the signals produced by the last mentioned means, means at the television receiver for receiving the transmitted signals, first means including first relay means responsive only to signals received for a first particular duration and including a bistable switch operatively controlled by the relay means for reducing the intensity of the sound upon a first reception of the signals of the first particular duration and for restoring the sound upon a second reception of the signals of the first particular duration, and second means including second relay means operatively coupled to the first relay means to become energized only upon the continuous energizing of the first relay means for a second particular period of time longer than the first particular period of time coupled to the on-off switch to actuate the switch into the "off" position upon a first energizing of the relay and to actuate the switch into the "on" position upon a second energizing of the relay, and means operatively coupled to the first and second means for preventing the sound from becoming reduced or increased in intensity upon the continuous energizing of the first relay means for the second particular period of time.

5. In combination for controlling the operation of a television receiver having a plurality of channels and having a selector for the different channels and having electrical stages for providing a picture and having electrical stages for providing sound to accompany the picture and having an electrical switch for turning the set on and off, means for receiving first signals having a first particular frequency and for receiving second signals having a second particular frequency different from the first frequency, a motor coupled to the selector for driving the selector in the forward and reverse directions, means coupled to the receiving means and operative upon the motor to energize the motor for driving the selector in the forward direction only upon the reception of the first signals and to energize the motor for driving the selector in the reverse direction only upon the reception of the second signals, means operative only upon the simultaneous reception of the first and second signals and including bistable means for turning off the on-off switch upon a first such reception and for turning on the on-off switch upon a second such reception, and means coupled to the motor-energizing means for preventing the motor from becoming energized only upon the simultaneous reception of the first and second signals.

6. In combination for controlling the operation of a television receiver having a plurality of channels and having a selector for the different channels, a motor coupled to the selector for driving the selector and having first winding means controlling the energizing of the motor and having second winding means controlling the operation of the motor to obtain an advance of the selector in a forward direction or in a reverse direction, receiving means for receiving transmitted signals having first and second particular frequencies, means connected in a circuit with the first winding means and with the receiving means for energizing the first winding means upon the reception of signals having only either the first or the second frequencies, first switching means coupled to the first energizing winding for actuation upon an energizing of the first winding means, delay means controlled by the first switching means, second switching means coupled to the delay means for actuation of a particular period of time after the actuation of the first switching means, means including the second switching means and responsive only to the signals at the first and second frequencies for obtaining an energizing of the second winding means upon the reception of signals having only either the first frequency or the second frequency for a particular period of time dependent upon the delay provided by the delay means, and means coupled to the second winding means and responsive to the received signals for energizing the second winding means in a particular relationship for an advance of the selector in the forward direction upon a reception of signals having only the first particular frequency and for an advance of the selector in the reverse direction upon a reception of signals having only the second particular frequency.

7. In combination for controlling the operation of a television receiver having electrical stages for providing a picture and electrical stages for providing sound to accompany the picture and having an electrical switch for turning the set on and off, means for receiving transmitted signals representing different controls to be provided over the operation of the receiver, first means including first relay means coupled to the receiving means and responsive to the simultaneous reception of transmitted signals having first and second frequencies and having only a first particular duration and including a first bistable switch actuatable by the first relay means and operative upon the electrical stages controlling sound to reduce the intensity of the sound upon a first operation of the control means and to restore the sound upon a second operation of the control means, switching means operatively controlled by the first relay means for actuation upon an energizing of the first relay means, second means including second relay means coupled to the last mentioned switching means and operative to become energized only upon an actuation of the switching means for a second particular time greater than the first particular time and coupled to the on-off switch in the television receiver to turn the receiver off upon a first energizing of the second relay means and to turn the receiver on upon a second energizing of the second relay means, and means coupled to the first and second means for preventing the intensity of the sound from being reduced or increased upon the actuation of the switching means for the second time.

8. In combination, means including first oscillatory means for providing signals at a first frequency, means including second oscillatory means for providing signals at a second frequency different from the first frequency, means including first switching means coupled to the oscillatory means for simultaneously providing signals at the first and second frequencies only for a first particular period of time upon the operation of the switching means, means including second switching means coupled to the oscillatory means for simultaneously providing signals at the first and second frequencies only for a second particular period of time upon the operation of the switching means where the second period of time is longer than the first period of time, means coupled to the first and second oscillators for providing a simultaneous transmission of the first and second signals, a television receiver including first means for providing a first control over the operation of the receiver and including second means for providing a second control over the operation of the receiver, means responsive to the transmitted signals and coupled to the television receiver and operative only upon a simultaneous reception of the first and second signals for at least the first particular duration to actuate the first control means in the receiver, and means responsive to the transmitted signals and coupled to the television receiver and operative only upon a simultaneous reception of the first and second signals for at least the second particular duration to actuate the second control means in the receiver.

9. In combination for controlling the operation of a television receiver having electrical stages for providing a picture and electrical stages for providing sound to accompany the picture and having a first bistable electrical switch for turning the set on and off, means for receiving transmitted signals having only at least one particular frequency and having a first particular duration to control the characteristics of the sound and having only a second particular duration longer than the first particular duration to control the operation of the on-off switch, electrical circuitry including a first relay responsive to the received signals to become energized only upon the reception of the signals of at least first duration, a second bistable switch coupled to the first relay for actuation by the relay and electrically coupled to the electrical stages controlling sound to provide a change in the characteristics of the sound from a particular value upon first alternate energizings of the first relay and to provide a restoration of the sound characteristics to the particular value upon second alternate energizings of the first relay, third switching means coupled to the first relay for actuation upon an energizing of the relay, and electrical circuitry including a second relay and including delay means electrically coupled to the relay for energizing the second relay only upon the energizing of the first relay for at least the second particular period of time and including the second bistable switch coupled to the second relay for actuation by the relay to provide alternate actuations of the second bistable switch into the off position and then into the on position in successive actuations of the switch.

10. In combination for controlling the operation of a television receiver having a plurality of channels and having a selector for the different channels, a motor coupled to the selector for driving the selector and having first winding means controlling the energizing of the motor and having second winding means controlling the operation of the motor to obtain an advance of the selector in a forward direction or in a reverse direction, receiving means responsive to transmitted signals having first and second particular frequencies, first relay means responsive to signals having the first and second frequencies, electrical circuitry including the first winding means and including first switching means coupled to the first relay means for energizing the first winding means upon the reception of signals having only either the first particular frequency or the second particular frequency, electrical circuitry including second switching means coupled to the first winding means and including second relay means for providing an energizing of the second relay means only after the energizing of the first winding means for a particular period of time, third switching means coupled to the second relay means for actuation upon the energizing of the second relay means, and electrical circuitry including the third switching means and including the second winding means and responsive to the energizing of the first relay means for energizing the second winding means for an advance of the selector in the forward direction upon the reception of signals at the first frequency and for an advance of the selector in the reverse direction upon the reception of signals at the second frequency.

11. In combination for controlling the operation of a television receiver having a plurality of channels and having a selector for the different channels and having electrical stages for providing a picture and having electrical stages for providing sound to accompany the picture and having a bistable electrical switch for turning the set on and off, means for receiving first signals having a first particular frequency and for receiving second signals having a second particular frequency different from the first particular frequency, a motor including first and second winding means and mechanically coupled to the selector for driving the selector in the forward and reverse directions in accordance with the energizing of the winding means, electrical circuitry including relay means operative only upon the reception of first or second combinations of the signals and including delay means coupled to the relay means for energizing the winding means to drive the selector in either the forward or reverse directions after the reception of either the first combination of signals or the second combination of signals for a first particular time, means including switching means operative only upon the simultaneous reception of a third combination of the first and second signals for preventing the winding means from becoming energized, and means including second relay means operative only upon the simultaneous reception of the third combination of the first and second signals and operative upon the bistable switch and including delay means coupled to the relay means for energizing the relay means to actuate the bistable switch only atfer the simultaneous reception of the third combination of the first and second signals for a particular time for turning off the bistable switch upon a first energizing of the relay means and for turning on the on-off switch upon a second energizing of the relay means.

12. In combination for controlling the operation of a television receiver having a plurality of channels and having a selector for the different channels and having electrical stages for producing sound to accompany the picture and having an electrical switch for turning the set on and off, a first oscillator for providing signals having a first particular frequency, a second oscillator for providing signals having a second particular frequency, means including switching means coupled to the oscillators for controlling the passage of signals of the first and second particular frequencies and for providing for the simultaneous passage of such signals for at least a first particular time, means coupled to the last mentioned means for providing for the simultaneous transmission of the signals passed by the last mentioned means, means at the television receiver for receiving the transmitted signals, a motor having first winding means and second winding means controlling the energizing and the direction of operation of the motor and coupled to the selector for driving the selector, means including electrical circuitry responsive to the received signals and coupled to the first and second winding means in the motor for producing an operation of the motor only upon a reception of signals at one of the frequencies for a particular period of time without a simultaneous reception of signals at the second frequency and for producing an operation of the motor in one direction only for received signals of the first frequency and for producing an operation of the motor in the opposite direction only for received signals of the second frequency, means including electrical circuitry responsive to the received signals and coupled to the on-off switch for actuating the switch only upon the simultaneous reception of signals of the first and second frequencies, and means including electrical circuitry responsive to the received signals and coupled to the motor operating means for preventing the motor from being energized only upon the simultaneous reception of signals of the first and second frequencies.

13. In combination for controlling the operation of a television receiver having a plurality of channels and having a selector for the different channels and having electrical stages for providing sound to accompany the pitcure and having an electrical switch for turning the set on and off, a first oscillator for providing signals having a first particular frequency, a second oscillator for providing signals having a second particular frequency, means including switching means coupled to the oscillators for controlling the passage of signals of the first and second particular frequencies and for providing for the passage of such signals for at least a particular time, means at the television receiver for receiving the transmitted signals, a motor coupled to the selector for driving the selector in a forward or reverse direction, means including first relay means responsive only to first and second combinations of the first and second frequencies in the received signals and operative upon such combinations of received signals to produce an operation of the motor in the forward direction only in accordance with the reception of signals of the first combination and to produce an operation of the motor in the reverse direction only in accordance with the reception of signals of the second combination, and means including second relay means responsive only to a third combination of the first and second frequencies in the received signals for actuating the on-off switch to turn the set off upon a first reception of such signals and to turn the set on upon a second reception of such signals.

14. In combination in apparatus for controlling the operation of an output system, first control means in the output system for providing a first control over the operation of the output system, second control means in the output system for providing a second control over the operation of the output system, third control means in the output system for providing a third control over the operation of the output system, a first stage coupled to the first control means and responsive only to first signals at a first particular frequency for obtaining an operation of the first control means, a second stage coupled to the second control means and responsive only to second signals at a second particular frequency different from the first particular frequency for obtaining an operation of the second control means, means including the first and second stages and coupled only to the third control means and responsive only to third signals at both the first and second particular frequencies for obtaining an operation of the third control means, and means responsive to the last mentioned means for preventing the first and second stages from individually operating the first and second control means upon the introduction of the third signals.

15. In combination in apparatus for controlling the operation of an output system, first control means in the output system for providing a first control over the operation of the output system, second control means in the output system for providing a second control over the operation of the output system, third control means in the output system for providing a third control over the operation of the output system, first electrical circuitry including a first relay responsive only to first signals at a first particular frequency and coupled to the first control means for obtaining an operation of the first control means upon an energizing of only the first relay, second electrical circuitry including a second relay responsive only to second signals at a second particular frequency different from the first particular frequency and coupled to the second control means for obtaining an operation of the second control means upon an energizing of only the second relay, third electrical circuitry including the first and second relays and responsive only to third signals at both the first and second particular frequencies and coupled to the third control means for obtaining an operation of the third control means upon the introduction of the third signals, and means including switching means responsive to the first and second relays for interrupting the energizing of the first and second electrical circuitry upon the introduction of the third signals.

16. In combination in apparatus for controlling the operation of an output system, first control means in the output system for providing a first control over the operation of the output system, second control means in the output system for providing a second control over the operation of the output system, third control means in the output system for providing a third control over the operation of the output system, fourth control means in the output system for providing a fourth control over the operation of the output system, first electrical circuitry including first energizing means responsive only to first signals at a first and second particular frequency and operative upon the first control means for obtaining the actuation of the first control means upon the occurrence of the first signals, second electrical circuitry including second energizing means responsive only to second signals at a second particular frequency different from the first particular frequency and operative up the second control means for obtaining the actuation of the second control means upon the occurrence of the second signals, third electrical circuitry including the first and second energizing means and including third energizing means responsive to third signals of a first duration at both the first and second particular frequencies and operative upon the third control means for obtaining the actuation of the third control means upon the occurrence of the third signals for the first duration, means operatively coupled to the third energizing means and operative upon the first and second electrical circuitry to prevent the first and second control means from becoming actuated upon the first occurrence of the third signals, fourth electrical circuitry coupled to the third energizing means and responsive only to the third signals for a second duration greater than the first duration and operative upon the fourth control means for obtaining the actuation of the fourth control means upon the occurrence of the third signals for the second duration, and means operatively coupled to the third electrical circuitry and the fourth electrical circuitry for preventing the third control means from being actuated upon the occurrence of the third control signals for the second duration.

17. In combination for providing first, second and third controls over the operation of an apparatus, means for providing first signals having first characteristics and for providing second signals having second characteristics different from the first characteristics and for providing third signals having third characteristics different from the first and second characteristics, first control means responsive only to the first signals to become energized, first output means responsive to the energizing of the first control means for providing the first control over the operation of the apparatus, second control means responsive only to the second signals to become energized, second output means responsive to the energizing of the second control means for providing the second control over the operation of the apparatus, third control means responsive only to the third signals and coupled to the first and second control means for obtaining a simultaneous energizing of the first and second control means upon the occurrence of the third signals, third output means operative upon the simultaneous energizing of the first and second control means for providing the third control over the operation of the apparatus, and means operative upon the simultaneous energizing of the first and second control means for preventing the first and second output means from being operated.

18. In combination for controlling the operation of a television receiver having a plurality of channels and having a selector for the different channels and having electrical stages for providing a picture and having electrical stages for providing sound to accompany the picture and having an electrical switch for turning the set on and off, means for receiving first signals having a first particular frequency and for receiving second signals having a second particular frequency different from the first frequency and for receiving third signals having a third particular frequency different from the first and second frequencies, a motor coupled to the selector for driving the selector in the forward and reverse directions, first control means coupled to the receiving means and operative upon the motor to energize the motor for driving the selector in the forward direction upon the reception of the first signals, second control means coupled to the receiving means and operative upon the motor to energize the motor for driving the selector in the reverse direction upon the reception of the second signal, means coupled to the last mentioned means and responsive only to the third signals for energizing the first and second control means, means coupled to the first and second control means for controlling the intensity of the sound in the television receiver upon the simultaneous energizing of the first and second control means, and means coupled to the first and second control means for preventing the motor from being energized upon the simultaneous energizing of the first and second control means.

19. In combination for providing first, second, third and fourth control over the operation of an apparatus, means for providing first signals having first characteristics and for providing second signals having second characteristics different from the first characteristics and for providing third signals having third characteristics different from the first and second characteristics and having first and second durations, means including first relay means responsive only to the first signals for energizing the first relay means, means including second relay means responsive only to the second signals for energizing the second relay means, means including first electrical circuitry operative upon the energizing of only the first relay means for providing the first control over the operation of the apparatus, means including second electrical circuitry operative upon the energizing of only the second relay means for providing the second control over the operation of the apparatus, means including the first and second relay means and responsive only to the third signals for simultaneously energizing the first and second relay means, means including third electrical circuitry responsive to the simultaneous energizing of the first and second relay means for preventing the first and second electrical circuitry from becoming energized, means including fourth electrical circuitry and responsive only to the simultaneous energizing of the first and second relay means for at least the first particular duration for providing the third control over the operation of the apparatus, and means including fifth electrical circuitry and responsive only to the simultaneous energizing of the first and second relay means for at least the second particular duration for providing the fourth control over the operation of the apparatus.

References Cited in the file of this patent

UNITED STATES PATENTS

| | | |
|---|---|---|
| 1,930,029 | Alden | Oct. 10, 1933 |
| 2,297,618 | Grimes et al. | Sept. 29, 1942 |
| 2,396,091 | DeBey | Mar. 5, 1946 |
| 2,397,475 | Dinga | Apr. 2, 1946 |
| 2,503,371 | Bachelet | Apr. 11, 1950 |
| 2,515,968 | Shanklin | July 18, 1950 |
| 2,547,023 | Lense et al. | Apr. 3, 1951 |
| 2,602,853 | Harrison | July 8, 1952 |
| 2,817,025 | Adler | Dec. 17, 1957 |
| 2,903,575 | Polley | Sept. 8, 1959 |

OTHER REFERENCES

"A Radio-Control System for Models," by H. W. Lawson, Jr., QST, February 1952, pp. 17–19.